(12) United States Patent
Ewing et al.

(10) Patent No.: US 10,685,326 B1
(45) Date of Patent: Jun. 16, 2020

(54) SYSTEMS AND METHODS FOR WIRELESSLY MONITORING INVENTORY

(71) Applicant: Christie Lites Enterprises USA, LLC, Orlando, FL (US)

(72) Inventors: David Ewing, Huntsville, AL (US); Eric Ibarra, Huntsville, AL (US); Todd Beales, Huntsville, AL (US); James Hannah, Orlando, FL (US); David Lloyd, Vancouver (CA)

(73) Assignee: Christie Lites Enterprises USA, LLC, Orlando, FL (US)

( * ) Notice: Subject to any disclaimer, the term of this patent is extended or adjusted under 35 U.S.C. 154(b) by 0 days.

(21) Appl. No.: 16/521,134

(22) Filed: Jul. 24, 2019

Related U.S. Application Data

(60) Provisional application No. 62/801,962, filed on Feb. 6, 2019.

(51) Int. Cl.
*G06Q 10/08* (2012.01)
*G06K 7/10* (2006.01)

(52) U.S. Cl.
CPC ..... *G06Q 10/0875* (2013.01); *G06K 7/10366* (2013.01)

(58) Field of Classification Search
CPC ................. G06Q 10/0875; G06K 7/10366
USPC ........................................................ 235/385
See application file for complete search history.

(56) References Cited

U.S. PATENT DOCUMENTS

| | | | |
|---|---|---|---|
| 7,970,871 B2 | 6/2011 | Ewing et al. | |
| 7,978,717 B2 | 7/2011 | Banks et al. | |
| 9,298,954 B1 | 3/2016 | Ewing | |
| 9,374,874 B1 | 6/2016 | Ewing | |
| 9,503,974 B1 | 11/2016 | Ewing et al. | |
| 9,619,989 B1 | 4/2017 | Ewing et al. | |
| 10,176,449 B1* | 1/2019 | Krohn | G06Q 10/087 |
| 2007/0164863 A1* | 7/2007 | Himberger | G06K 17/0029 340/572.1 |
| 2009/0045916 A1* | 2/2009 | Nitzan | G06K 19/0702 340/10.1 |
| 2015/0235060 A1* | 8/2015 | Liao | G06K 7/10009 340/10.1 |
| 2017/0357934 A1* | 12/2017 | Cobb | G06Q 10/087 |
| 2018/0374039 A1* | 12/2018 | Walden | H04W 4/35 |
| 2019/0090114 A1* | 3/2019 | Van Meter, II | G06Q 50/10 |

OTHER PUBLICATIONS

"NRF52832 Product Specification v1.3," Nordic Semiconductor, 2017, pp. 1, 205-233.

(Continued)

*Primary Examiner* — Daniel A Hess
(74) *Attorney, Agent, or Firm* — Maynard Cooper & Gale, P.C.; Jon E. Holland

(57) ABSTRACT

Systems and methods for automated monitoring of inventory are disclosed. In accordance with some embodiments of the disclosure, automated monitoring is achieved through the use of active tags, such as RFID tags, that are coupled to inventory and tracked by communication nodes. The tags are designed to consume a low amount of power while ensuring robust wireless communication. Indeed, the tags are capable of communicating with remote nodes even when the tags are buried in stacks of inventory items, and the system is scalable to handle a large number of tags.

37 Claims, 17 Drawing Sheets

(56) References Cited

OTHER PUBLICATIONS

Wexler, Joanie, "Bluetooth and ZigBee: Their similarities and differences," https://www.networkworld.com/article/2318704/bluetooth-and-zigbee--their-similarities-and-differences.html, 2005.

* cited by examiner

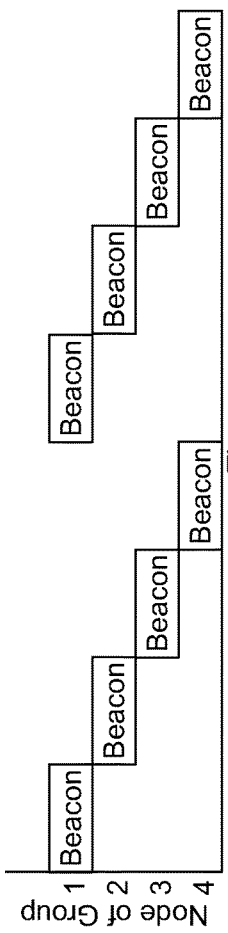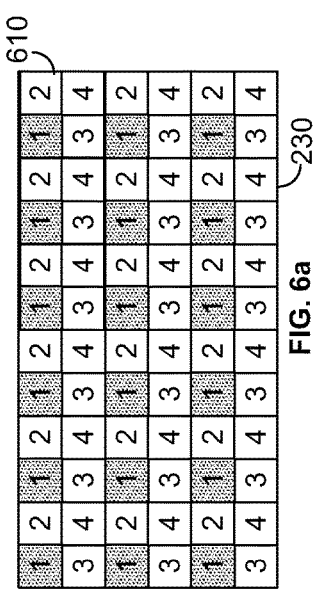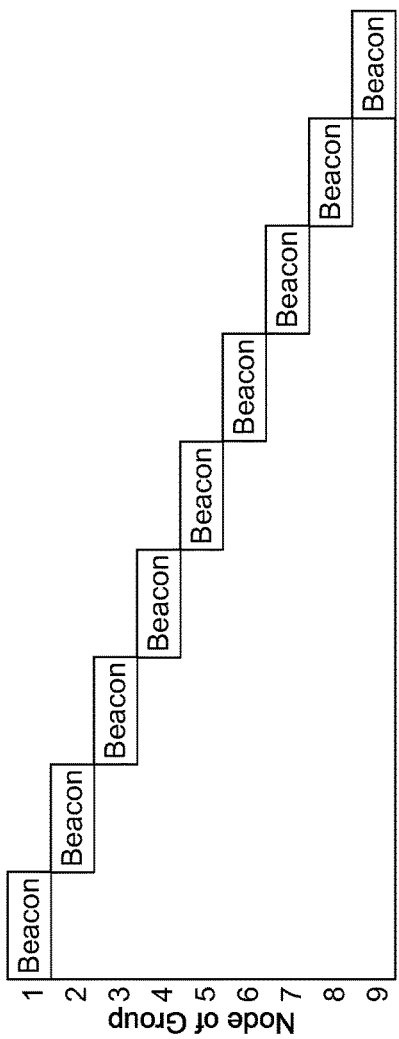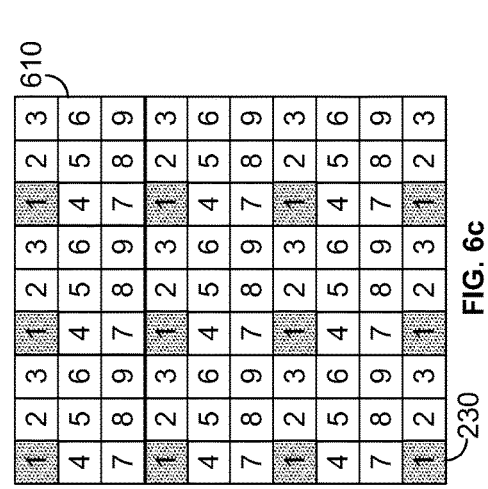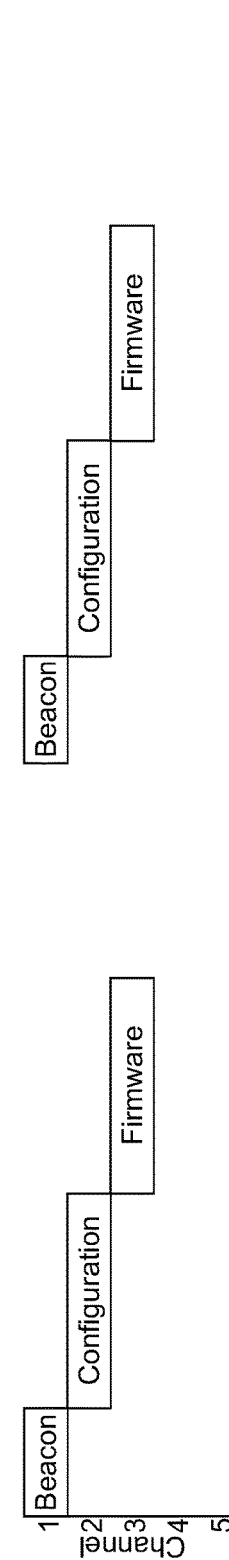

SYSTEMS AND METHODS FOR WIRELESSLY MONITORING INVENTORY

CROSS REFERENCE TO RELATED APPLICATION

This application claims priority to U.S. Provisional Patent Application No. 62/801,962, entitled "Active Inventory Control System for Difficult Environments," and filed on Feb. 6, 2019, which is incorporated herein by reference.

RELATED ART

Warehouses, equipment-rental buildings, and other similar facilities have vast amounts of inventory to store, track, ship, or maintain. It is not unusual for such a facility to house thousands or even hundreds of thousands of items at any moment. Additionally a substantially larger number of items may often pass through such facilities over time.

Keeping track of inventory can be performed by tracking the items entering and exiting the facility with teams of people using barcode or near field communication (NFC) readers, such as passive radio frequency identification (RFID) readers. Bottlenecks are often handled by use of staging areas in which items can wait before going through a check-in or check-out process. Alternatively, additional teams of people or automated conveyors can be used to increase the check in and check out throughput.

As space can be at a premium, inventory is sometimes kept in large stacks or densely packed shelves. Inventory items can become easily misplaced or lost, and performing an audit or inventory of the items in the storage facility can be burdensome and costly.

In an effort to alleviate some of these problems and facilitate tracking of inventory items in a storage facility, active tags (e.g., active RFID tags) have been used, and these active tags, which do not rely on load modulation of a carrier signal from a reader, are configured for wireless communication across longer ranges than NFC. In this regard, each inventory item may be coupled to an active tag that wirelessly communicates with one or more nodes mounted throughout the facility, and each tag conveys information about the inventory item to which it is coupled. Thus, in theory, it is possible to automatically inventory in real time the items stored at the facility.

However, communication problems may prevent at least some tags from communicating with the facility nodes, thereby resulting in inaccurate or incomplete inventory reports. As an example, physical obstructions and noise at the facility may degrade or interfere with communication. In addition, as objects are moved within the facility, the communication characteristics of the environment may materially change over time, making it difficult to compensate for possible dead zones or noise patterns. In addition, as the number of inventory items increases, congestion in the facility may increase exponentially making it even more difficult to ensure reliable communication. These effects can be particularly problematic for certain types of inventory that can materially interfere with wireless signals.

As an example, some inventory, such as theatrical lights, are stored and transported in large cases that can be stacked on top of one another in a storage facility. Thus, depending on how cases are arranged in a storage facility, a wireless signal from a tag on equipment in any given case may pass through several other cases, which attenuate the wireless signal, thereby limiting the range of successful communication with the tag. In an attempt to address this issue, the transmission power of the tags can be increased, but increasing the transmission power of the tags has several drawbacks. For example, higher transmission powers for the tags can undesirably increase noise levels within the facility and also increase the power requirements of the tags, thereby reducing battery life. Thus, it is generally desirable to optimize the communication between the tags and the facility nodes so that lower transmission powers can be used, thereby extending the useful life of the tags' batteries. Moreover, designing a communication system that is robust, low cost, and reliable for use in large-scale storage facilities without requiring frequent replacement of tag batteries is challenging, and better techniques for tracking inventory at a storage facility or other area for storing inventory are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 6a is a block diagram illustrating an exemplary grouping of nodes at an inventory storage facility.

FIG. 6b is a timing diagram illustrating an exemplary timing pattern of beacons for a group of four nodes at an inventory storage facility.

FIG. 6c is a block diagram illustrating an exemplary grouping of nodes at an inventory storage facility.

FIG. 6d is a timing diagram illustrating an exemplary timing pattern of beacons for a group of nine nodes at an inventory storage facility.

FIG. 6e is a timing diagram illustrating an exemplary timing pattern for a node at an inventory storage facility.

DETAILED DESCRIPTION

The present disclosure generally pertains to systems and methods for automated monitoring of inventory. In accordance with some embodiments of the disclosure, automated monitoring is achieved through the use of active tags, such as RFID tags, that are coupled to inventory and tracked by communication nodes. The tags are designed to consume a low amount of power while ensuring robust wireless communication. Indeed, the tags are capable of communicating with remote nodes even when the tags are buried in stacks of inventory items, and the system is scalable to handle a large number of tags.

Figure 1:
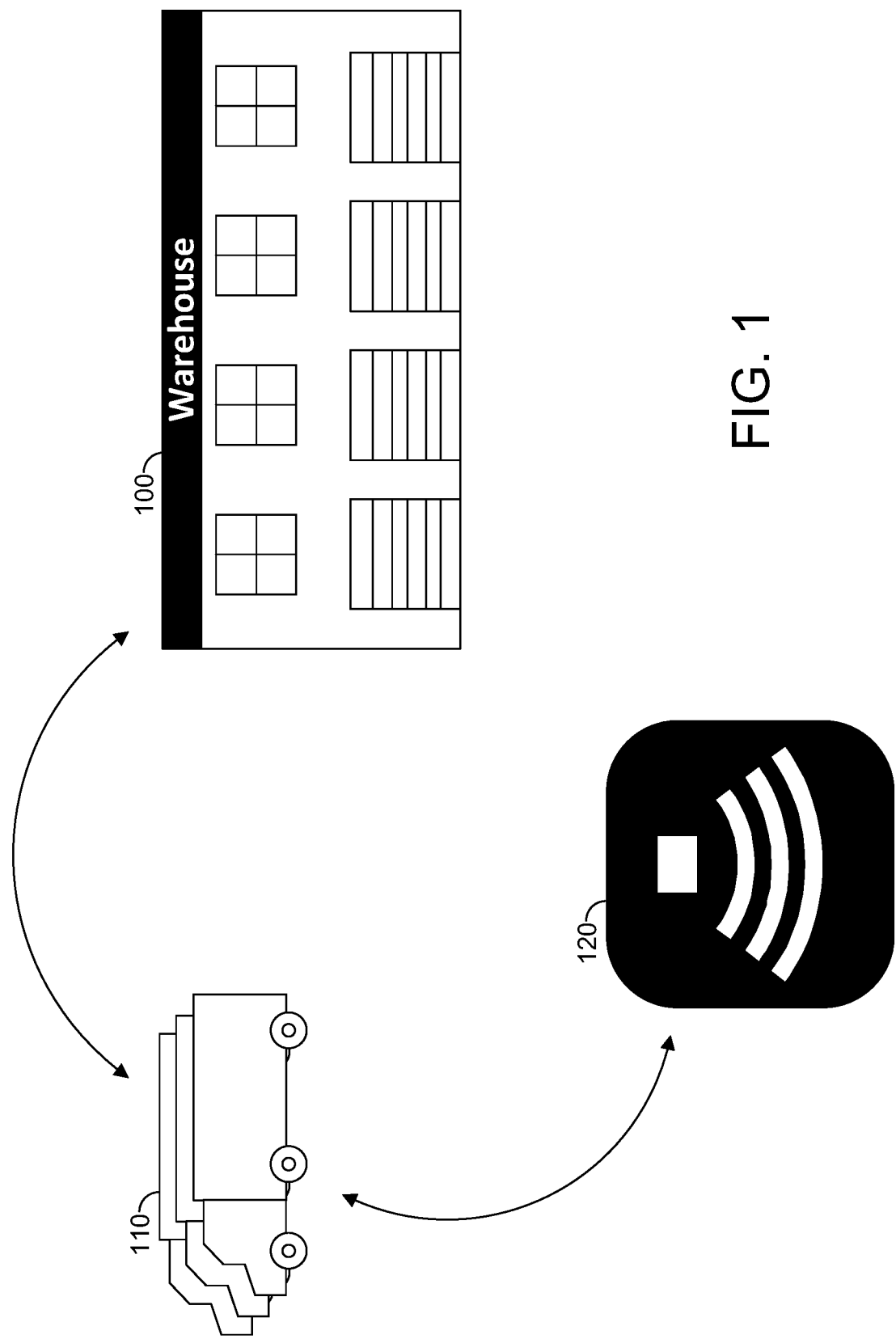
FIG. 1 depicts delivery of equipment from an inventory storage facility, such as a warehouse, to a destination.

To better understand some of the difficult environments in which tags may need to communicate, a short discussion of the life cycle of large-scale equipment rentals and related enterprises will be insightful. Referring to FIG. 1, a large-scale equipment rental warehouse 100 or other storage facility may store a large number of inventory items. As an example, each inventory item may be a large case containing theatrical lights and related equipment for concerts or other types of theatrical events, although other types of inventory items are possible in other embodiments. As an example, in addition to or in lieu of theatrical lights, the cases may include lighting support equipment (e.g., power distribution, data distribution, rigging, and control consoles), lighting accessories, and sound equipment (e.g., power distribution, data distribution, rigging, and speakers).

When a concert or other event is to occur, any number of the inventory items may be gathered and moved to a staging area at or near the storage facility 100 where the equipment will wait until the time for it to be collected or shipped by trucks 110 or other vehicles to a destination 120. The storage areas in the trucks 110 are not climate controlled. Hence, in cold weather, the temperature of the inventory items can drop to well below freezing and in hot weather the temperature can rise well above 100 degrees Fahrenheit. At the destination 120, such as a stadium, arena, or other venue for a rock concert, political rally, or other event, the tags used to monitor the inventory items may be exposed to radio frequency (RF) noise and outside temperatures and conditions (e.g., rain, snow, heat, and direct sunlight). Additionally, in some of these environments, transmitting radio frequency broadcasts from the tags can cause interference to the surrounding equipment, such as audio equipment for producing sound at the event. After occurrence of the event, the inventory items might be returned to the storage facility or other storage facilities for storage until the next event.

At any given time, a large number of inventory items may be moving into and out of a warehouse or other storage facility. Further, within the facility, there may be a large number, such as many thousands or even hundreds of thousands, of inventory items with many of the inventory items stacked on top of each other. There also may be considerable RF noise within the facility, and temperature fluctuations may be extreme. Ensuring reliable communication within such an environment at a relatively low power to ensure long battery life is very challenging. As the number of tags in the facility increases, thereby increasing the risk of data collisions, the communication environment within the facility becomes even more challenging.

In various embodiments described herein, the challenges plaguing conventional systems are addressed using a variety of techniques for saving power, extending range, avoiding collisions, and increasing scalability. As an example, in some embodiments, communication protocols and asset tracking processes are used that enable tags coupled to the inventory assets to remain in a sleep state for extended periods of time, thereby conserving power and increasing battery life. Further, collision avoidance schemes are used that help to avoid collisions while also conserving battery power. In addition, in some embodiments, a modulation scheme is selected that enables the tags to have a relatively long communication range at relatively low transmission powers. Using the techniques described herein in combination can provide a solution that is very robust and reliable with very low power requirements and high scalability.

Figure 2:
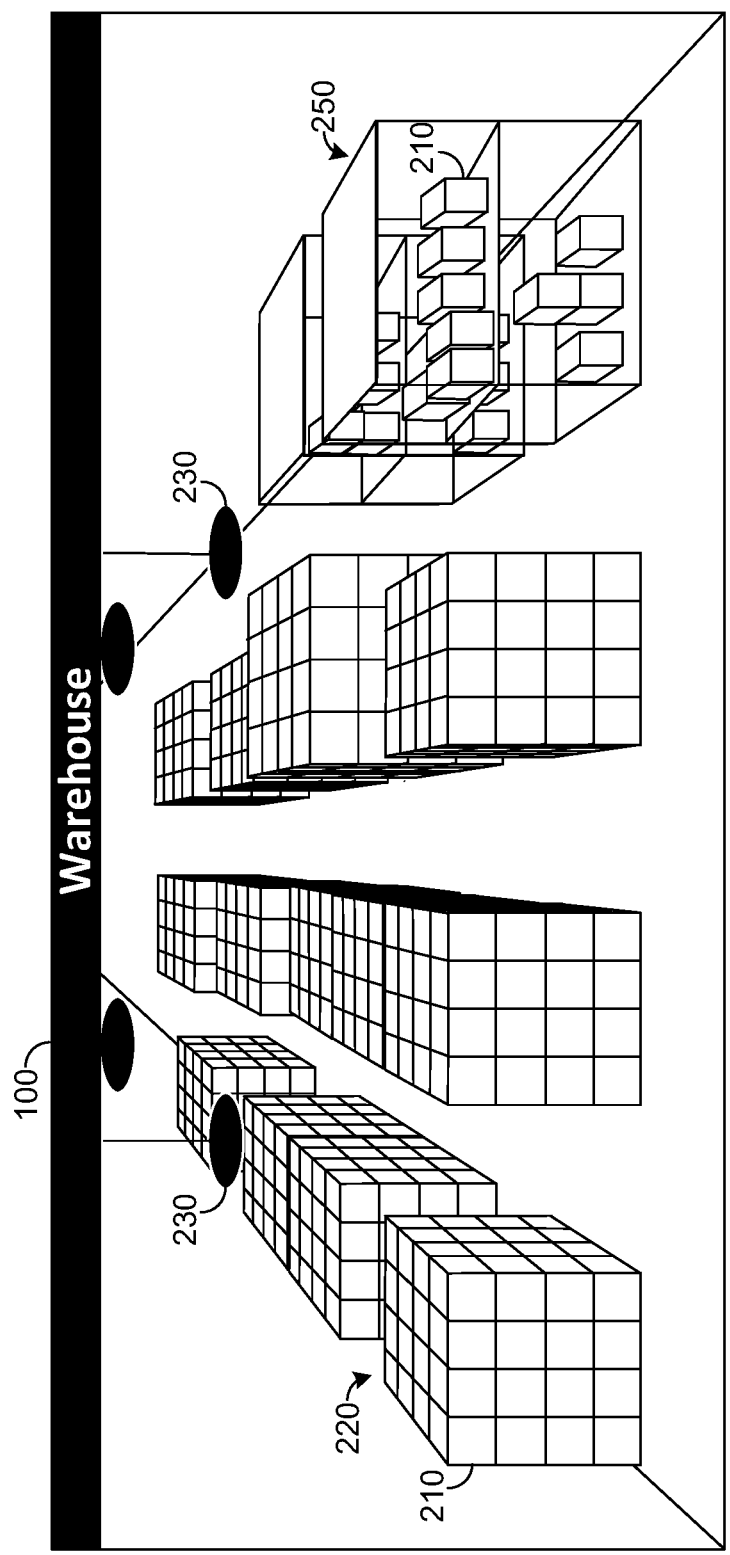
FIG. 2 depicts an exemplary embodiment of an inventory storage facility, such as a warehouse, with ceiling mounted nodes.

FIG. 2 shows an exemplary storage facility 100, such as a warehouse, that may be used to store a large number of inventory items 210. In the storage facility 100 shown by FIG. 2, individual inventory items 210, such as cases containing equipment (e.g., theatrical lights) to be used at concerts or other types of events, are stored in stacks 220 or on shelves 250, though other arrangements of inventory are possible in other embodiments. Stationary nodes 230 are positioned at various locations at or near the facility 100 and implement a network for communicating with active tags (not shown in FIG. 2) coupled to the inventory items 210. Any of the nodes 230 may be hung or otherwise attached to the ceiling or to the walls of the facility 100. The number and locations of the nodes 230 are preferably selected so as to provide coverage throughout the facility 100 for communication with the tags of the inventory items 210. That is, the nodes 230 are situated such that a tag in any of the storage areas within the facility 100 is capable of communicating with at least one node 230.

In some embodiments, the nodes 230 have indicator lights that can be seen from the facility floor. These indicator lights may be used for conveying certain status information about the node 230, such as whether the node 230 is in an error state, able to communicate with the network, connected to a server, or other status information about the node 230. As shown, items 210 can be arranged in various ways including in stacks 220 of different sizes, layers, heights, widths, and lengths. Items 210 may also be stored on shelves 250 in various arrangements. Although not shown, the facility 100 may also include multiple rooms, floors, and buildings.

Figure 3:
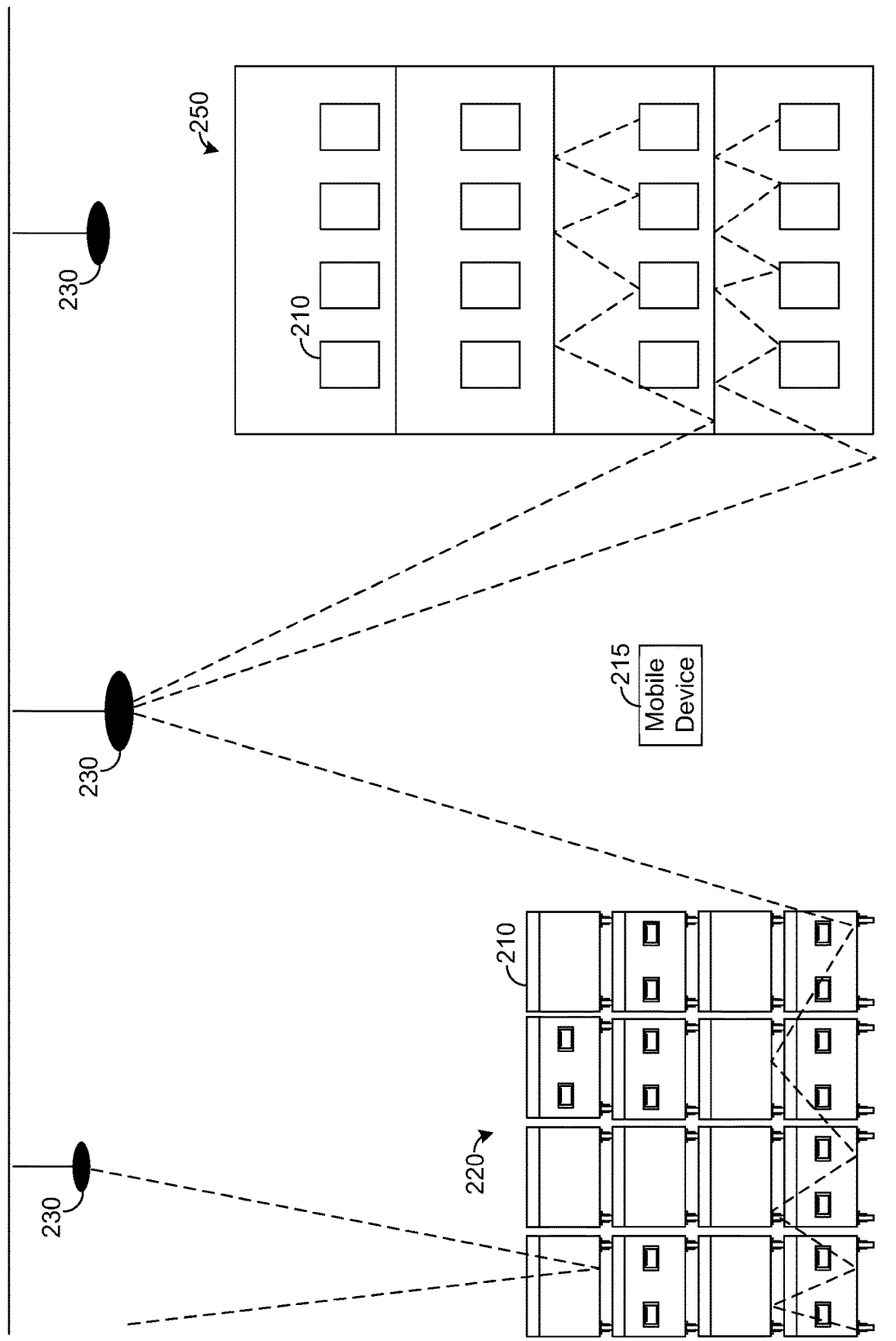
FIG. 3 depicts an exemplary embodiment of an inventory storage facility, such as a warehouse, with ceiling mounted nodes.

FIG. 3 depicts various inventory items 210 stored in one or more storage areas of the facility 100. The height of the ceiling may be any of various heights, such as between about 8 feet to 40 feet or more.

Figure 4A:
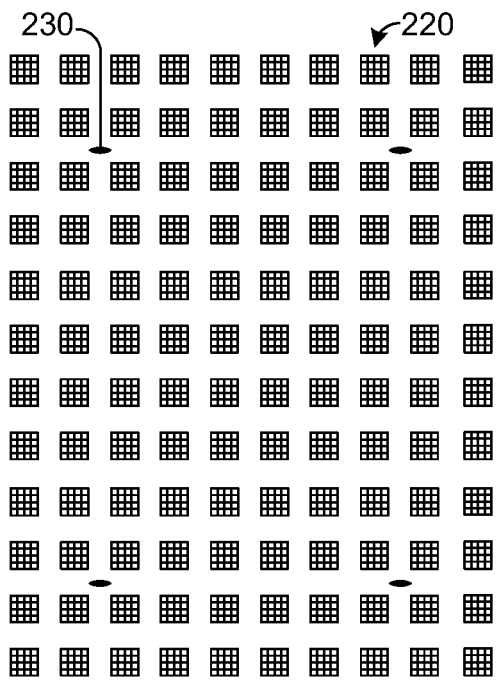
FIGS. 4a-d are block diagrams illustrating exemplary arrangements of nodes at an inventory storage facility.
Figure 4B:
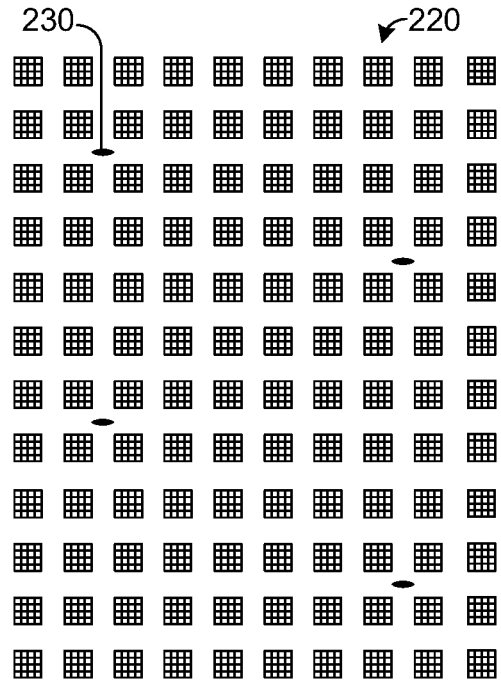
Figure 4C:
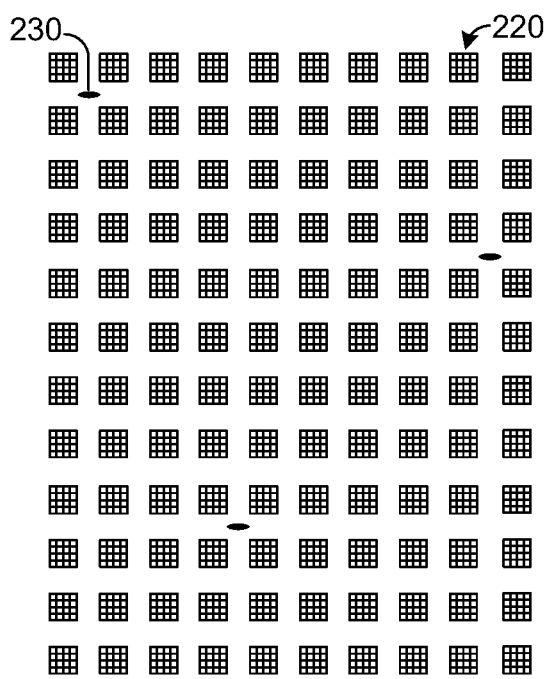
Figure 4D:
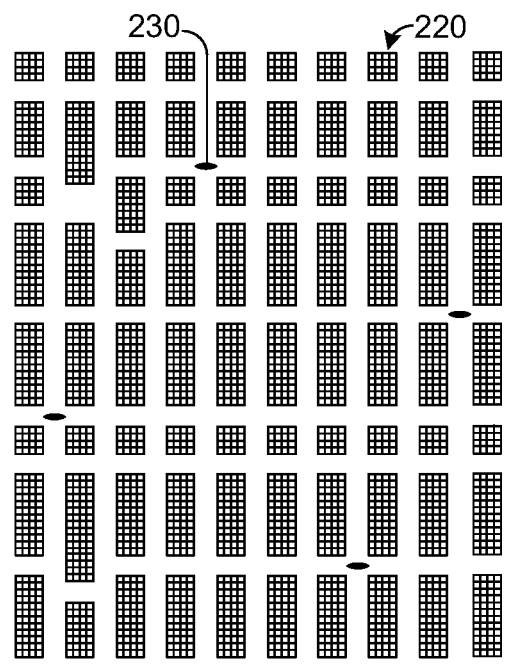

As shown in FIGS. 4a-d, the nodes 230 can be positioned in a variety of ways. For example, the nodes 230 may be arranged in orderly rows (see FIG. 4a), offset rows (see FIG. 4b), or a non-symmetric arrangement (see FIG. 4c). FIG. 4d shows that the offset pattern of the nodes 230 may be affected somewhat by the layout of the stacks 220 of items 210, machinery, or other obstacles, and the stacks 220 may vary in their arrangement. The nodes 230 may use a directional, spread spectrum antenna, but other types of antennas may be used in other embodiments. In one embodiment, the nodes 230 are suspended from the ceiling of the facility 100 and pointed downward such that their communication ranges are directed toward the inventory items 210. In other embodiments, at least some nodes 230 may be mounted to walls of the facility 100 or otherwise positioned as may be desired to provide effective coverage for the inventory items 210 to be monitored.

Figure 5:
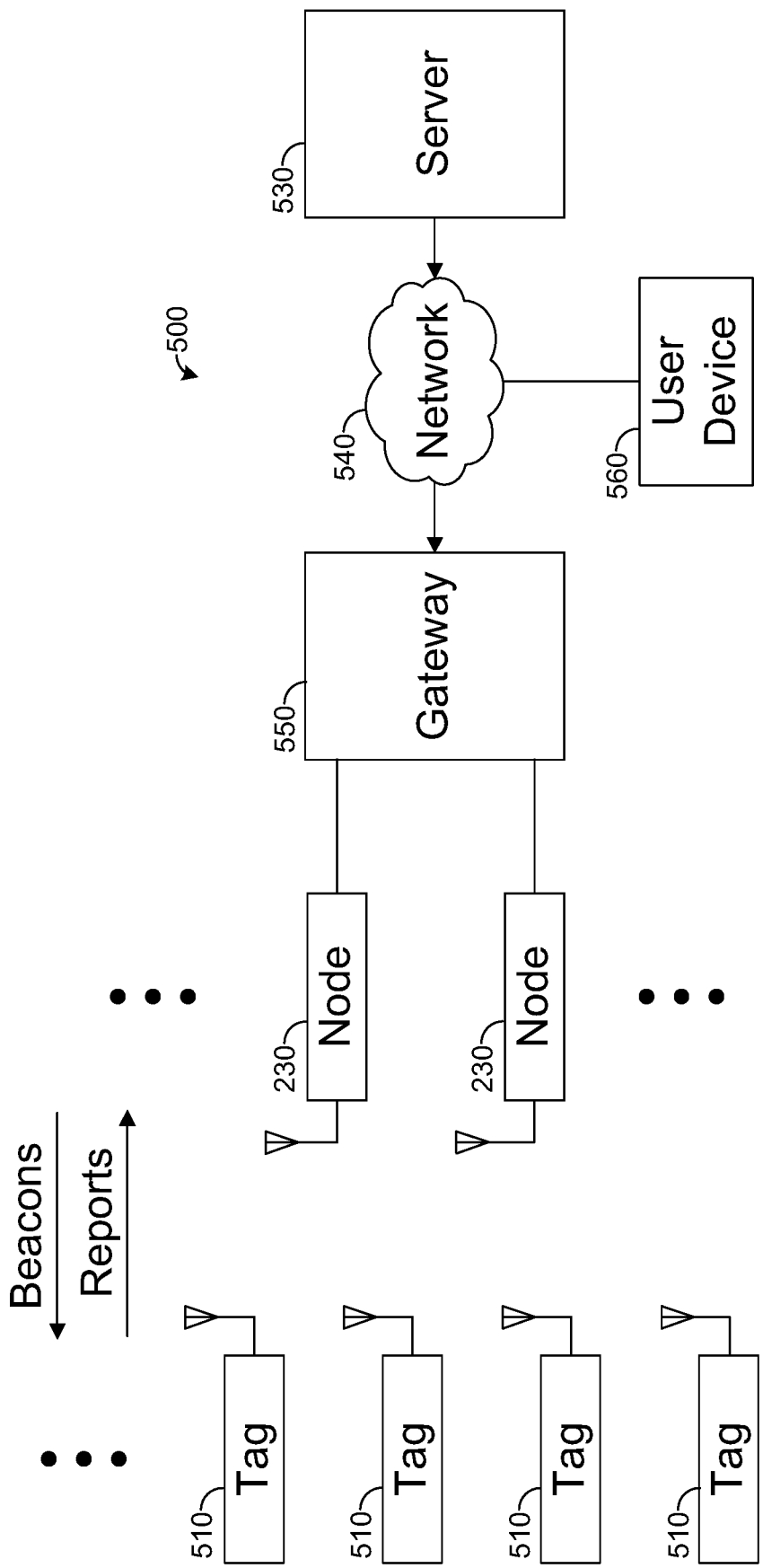
FIG. 5 is a block diagram illustrating an exemplary embodiment of an inventory monitoring system.

FIG. 5 shows an exemplary embodiment of a system 500 for tracking inventory at the facility 100. As shown by FIG. 5, the system 500 comprises a plurality of active tags 510 where each tag 510 is mounted on or otherwise coupled to a respective inventory item 210 and is in wireless communication with at least one node 230, as will be described in more detail below.

In order to conserve power, each tag 510 remains in a sleep state and from time-to-time wakes up (e.g., about every fifteen to thirty minutes, or some other time period) to attempt communication with a node 230. In this regard, as will be described in more detail below, each node 230 is configured to periodically broadcast a beacon. If a tag 510 hears a beacon within a predefined time of transitioning from a sleep state to an awake state, the tag 510 transmits a message that can be heard by the nodes 230. As an example, the tag 510 may transmit a report that identifies the tag 510 so that a presence of the tag 510 and its associated equipment at the facility 100 or other storage location can be determined. If desired, the report may include other information, such as information about the inventory item 210 to which the tag 510 is coupled or status information about the tag 510 (e.g., a value indicative of an amount of available power or life for a battery in the tag 510 or a measurement of any tag sensor). Such information may include an identifier of the inventory item 210 (e.g., an identifier of the case holding equipment or an identifier of the equipment held by the case) or indicate the type of inventory asset (e.g., a serial or model number of equipment held by the case). Thus, based on the reports transmitted by the tags 510 within the facility 100, a complete list of the inventory items 210 in the facility 100 can be automatically determined, as will be described in more detail below.

In some embodiments, the nodes 230 and tags 510 form a network, such as a wireless mesh network, but other types of networks may be employed in other embodiments. Nodes 230 transmit tag reports received from the tags 510 to a server 530, which is configured to use the reports to monitor and track the inventory items 210 over time. In this regard, as shown by FIG. 5, the nodes 230 may be coupled to the server 530 through a network 540 and one or more gateways 550. For simplicity of illustration, FIG. 5 shows a single gateway 550, but there may be any number of gateways 550 in other embodiments. In fact, in some embodiments, each node 230 may be a gateway that is configured to communicate directly with the network 540, as will be described in more detail below.

The gateway 550 is configured to receive messages from the nodes 230 and/or tags 510 and convert the messages into a suitable format for transmission through the network 540. As an example, if the network 540 comprises the Internet, the gateway 550 may be configured to encapsulate a messages from a node 230 or tag 510 with overhead compatible with the network 540 and transmit the message through the network 540 to the server 530. Messages received by the gateway 550 from the network 540, such as messages transmitted by the server 530, may be converted by the gateway 550 into a format compatible with the nodes 230 or tags 510. As an example, the gateway 550 may be configured to de-encapsulate messages from the network 540 to remove overhead used by the network 540 and forward the de-encapsulated messages to the nodes 230 or tags 510.

The network 540 may include one or more conventional networks, such as local area networks (LANs), wide area networks (WANs), such as the Internet, or other types of networks. Further, the server 530 may be local (e.g., at the facility 100) or remote from the facility 100, as may be desired. Information at the server 530 may be accessed by a user to determine an inventory of the items 210 at the facility 100 or other storage location. As an example, a user may have a user device 560, such as a smartphone or other type of computer, that is configured to communicate with the server 530 via the network 540 or otherwise and display information from the server 530. As an example, a list of inventory items 210 determined to be at the facility 100 at any given time may be displayed to the user. In other examples, other types of information may be accessed.

Depending on the size of the storage facility, nodes 230 may be arranged into groups 610 of nodes, as seen in FIGS. 6a and 6c. For illustrative purposes, each node 230 is assigned a sequence number indicative of when the node 230 is permitted to transmit during a time frame. In this regard, as will be described in more detail below, transmissions of the nodes 230 are time-division multiplexed, and nodes 230 assigned the same sequence number are permitted to transmit at the same time. In FIG. 6a, nodes assigned a sequence number of "1" have been shaded to help show that the nodes 230 assigned the same sequence number are separated in space so that their ranges preferably do not overlap, thereby preventing interference between transmissions of such nodes 230. The nodes 230 of a given group may be positioned sufficiently close to each other such that their transmission ranges overlap. However, such transmissions are time-division multiplexed so that they do not overlap in time, thereby preventing interference. In this regard, each of the nodes 230 of the same group 610 is assigned a different sequence number such that it is only permitted to transmit at a different time relative to the other nodes 230 of the same group. FIG. 6a shows an embodiment having four nodes 230 per group 610, with the nodes 230 assigned sequence numbers from 1 to 4, and in FIG. 6c shows an embodiment having nine nodes 230 per group 610, with nodes assigned sequence numbers from 1 to 9. In other embodiments, there may be any number of nodes 230 in a given group.

As noted above, each of the nodes 230 is configured to periodically broadcast beacons that can be heard by the tags 510 that are within range of the node 230 (e.g., at the facility 100 or other storage location). These beacons are broadcast using time-division multiplexing (TDM) as described above in order to prevent interference between nodes 230 that are in range of each other. As an example, FIGS. 6b and 6d show exemplary timing diagrams for beacons transmitted by nodes in groups of 4 and 9, respectively. In this regard, in each group, nodes 230 are arranged, synchronized, and assigned a sequence number with a repeating time pattern so nodes 230 of each group 610 having the same sequence number will have the same TDM slot and broadcast at the same time. As described above, nodes 230 of the same sequence number in different groups 610 are preferably arranged as to be sufficiently far from each other to avoid interference.

In some embodiments, each of the nodes 230 is configured to communicate on multiple channels. One channel may be used as a tag reporting channel for listening for tag reports. Another channel may be used for sending beacons to the tags 510. Yet other channels may be used for other purposes, and each of the channels may be time-division multiplexed, as described above. As an example, one channel may be used to transmit configuration updates to the tags 510, and another channel may be used to transmit firmware updates to the tags 510. FIG. 6e shows the transmission of beacons in two consecutive TDM time slots for a node 230 in channel 1, which is a beacon transmission channel in this example. As shown by FIG. 6e, between two successive beacon broadcasts, the node 230 may switch to other channels for communicating other types of information. As an example, the node 230 may transmit configuration updates to tags 510 in channel 2, which is a configuration update channel in this example, the nodes may transmit firmware updates to tags 510 in channel 3, which is a firmware update channel in this example. These other channels may be time-division multiplexed, like the beacon channel, such that multiple nodes 230 as a whole effectively transmit on each channel in a continuous manner over time.

In some embodiments, each facility 100 may employ the same set of channels for the same purposes. Thus, a tag 510 that travels from one facility 100 to another (e.g., is checked out of one facility 100 and is checked in to another facility 100) is not required to learn a new set of channels. However, using the same set of channels for the same purposes may be impracticable in some cases. As an example, the noise characteristics at one facility 100 may be different than the noise characteristics at another such that it is desirable to use a different set of channels or to change the purpose of one or more channels from one facility 100 to another.

In some embodiments, a specific channel, referred to herein as "announcement channel," is used at all or at least a plurality of facilities 100 for announcing the channel configuration that is used at the facility 100. This announcement channel may be at the same predefined frequency for all facilities 100 so that when a tag 510 arrives at a facility 100, it is configured to automatically listen on the announcement channel to learn the channel configuration for the facility 100. The tag 510 may thereafter communicate according to such channel configuration while at this facility 100.

In other embodiments, each tag 510 may be configured to search for and find the beacon channel used by the nodes 230. In this regard, the nodes 230 at various facilities 100 may be configured to use one of a predefined set of channels to transmit beacons. As an example, the nodes 230 may use tunable transmitters that may be tuned to any of predefined set of channels (e.g., three channels or some other number of predefined channels). Alternatively, each node 230 may have different transmitters tuned to different frequencies to enable it to transmit on multiple channels. Depending on the noise characteristics at a facility 100, any of the predefined channels may be selected for the transmission of beacons, and the nodes 230 at a given facility are configured to transmit their beacons on the selected channel for the facility 100.

When a tag 510 has not heard a beacon for a certain amount of time (e.g., is in the Outside state described in more detail below), such as when the tag is outside of the range of any node 230, the tag 510 may be configured to search for and find a beacon channel. In this regard, the tag 510 may scan the predefined channels until it hears a beacon on one of the channels. That is, the tag 510 may listen on one of the channels for a predefined amount of time and then switch to listening on a different channel if no beacon is heard. The tag 510 may continue switching among the predefined channels, until it hears a beacon. Note that the tag 510 may switch between channels by tuning a receiver as appropriate to hear on the respective channel or may use multiple receivers tuned to different frequency ranges.

In some embodiments, the tag 510 listens on only one channel for each awake/sleep cycle. That is, when the tag 510 awakens, the tag 510 listens on one of the predefined channels for a predefined amount of time. If it does not hear a beacon within the predefined time period, it goes back to sleep without attempting to communicate with any nodes 230. The next time it awakens, it may attempt listening on a different predefined channel. In this regard, the tag 510 may cycle through the predefined channels consecutively or may randomly select a predefined channel each time it awakens. The tag 510 also updates its settings to indicate which channel it heard the beacon. Thereafter, as long as the tag 510 remains within range of the nodes 230, the tag 510 (based on the updated settings) continues using the same beacon channel for receiving beacons each time it awakens from a sleep state. Once it determines that it is no longer within range of the nodes 230 using such channel (e.g., has entered the Out stage described in more detail below), the tag 510 may again search for a beacon channel.

In some embodiments, the node broadcasting channels (e.g., the beacon channel and other channels on which the nodes 230 may transmit) are separate from the tag reporting channels. That is, the transmissions by the tags 510 are separated in frequency from the transmissions of the nodes 230.

In addition, any number of tag reporting channels may be used to transmit tag reports from the tags 510 to the nodes 230. In some embodiment, each node 230 may use any of a predefined set of tag reporting channels. As an example, for a given facility 100 there may be three predefined tag reporting channels that can be selected by the tags 510. The tag reporting channels used at a given facility 100 may be indicated by the beacons that are transmitted by the nodes 230 or otherwise communicated from the nodes 230 to the tags 510. When a tag 510 is to transmit a tag report, the tag 510 may randomly select one of the predefined tag reporting channels or select one of the predefined tag reporting channels based on other factors, and transmit a tag report on the selected channel. Randomly selecting the tag reporting channels helps to ensure that the transmissions by the tags 510 are randomly dispersed across the tag reporting channels over time, thereby helping to increase the likelihood that at least one tag report from each tag 510 is successfully received by a node 230 over multiple attempts, relative to an embodiment in which each tag 510 attempts to report on a single channel that may be congested or affected by noise. To enable a tag 510 to communicate on different channels, the tag 510 may have multiple transmitters (each tuned to a different frequency range) or have a tunable transmitter that may be tuned to the selected channel.

Figure 7:
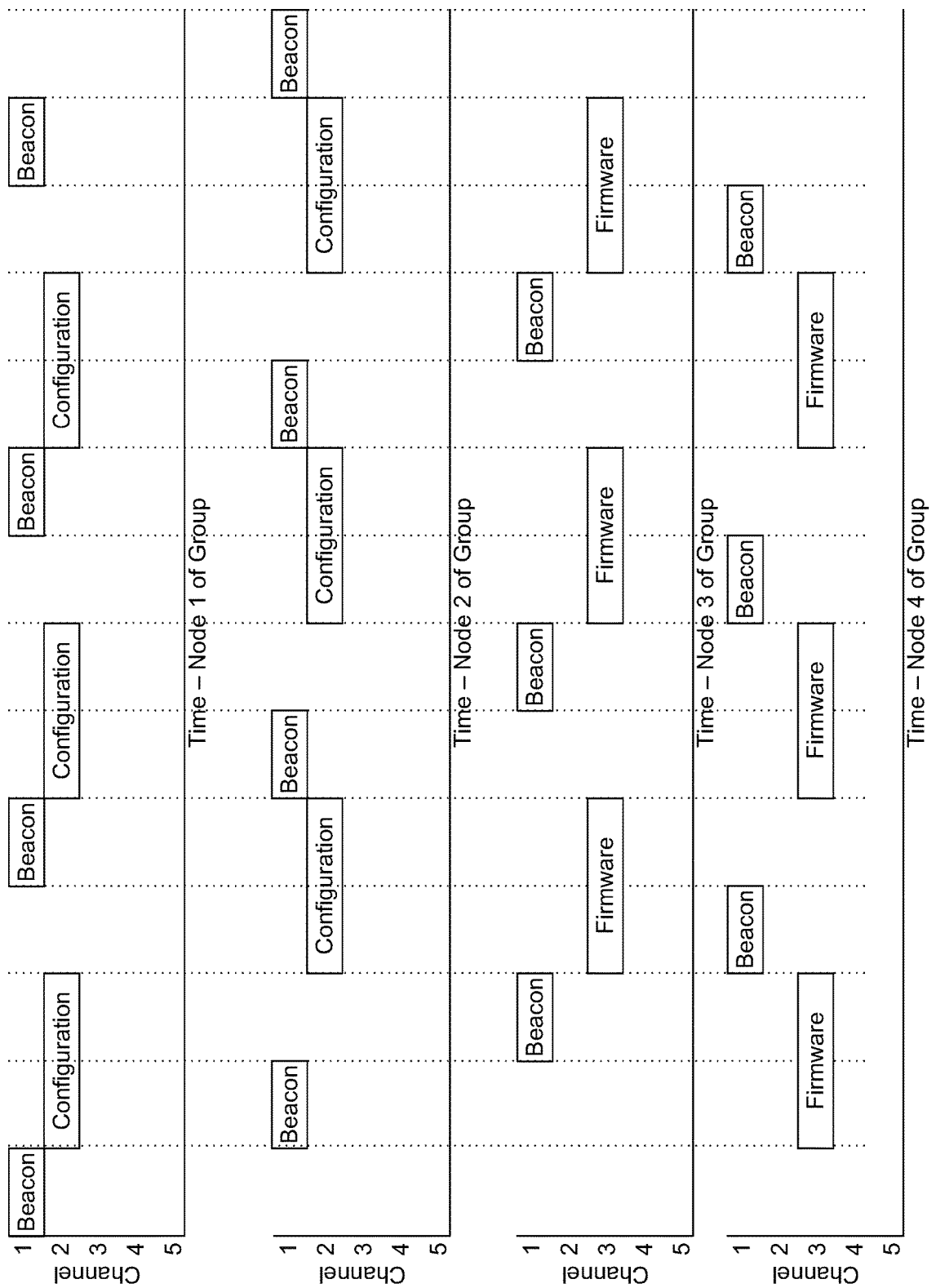
FIG. 7 is a timing diagram illustrating exemplary timing patterns for a group of nodes at an inventory storage facility.

Alternatively other nodes 230 in the node group 610 may be listening to the other tag reporting channels such that at least one node 230 in each group 610 has at least one receiver listening to each tag report channel. Depending on the number of nodes 230 in a node group 610 and amount of different updates required, different nodes 230 within a the node group 610 may take turns sending firmware and configuration updates, see FIG. 7.

Figure 8:
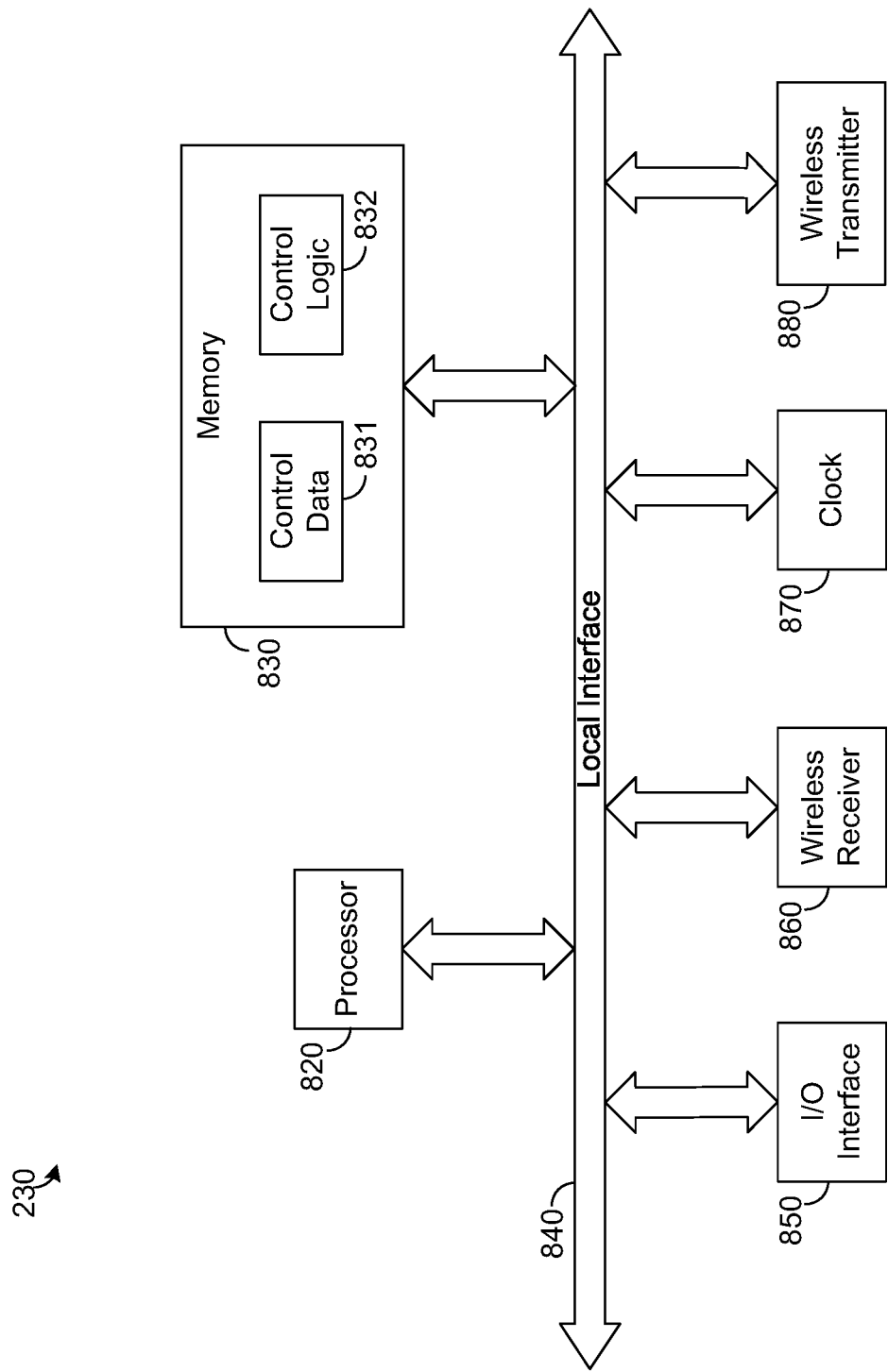
FIG. 8 is a block diagram illustrating an exemplary embodiment of a node, such as depicted by FIG. 2-5.

FIG. 8 depicts an exemplary embodiment of a node 230. The node 230 shown by FIG. 8 has a network interface 810, at least one processor 820, memory 830, input/output (I/O) Interface 850, wireless receiver 860 for receiving messages (such as tag reports) from tags 510, a clock 870, and a wireless transmitter 880 for transmitting messages (such as beacons) to tags 510. The above components are connected through a local interface 840 which may include at least one bus. The node 230 has control logic 832 that is configured to control the operation of the node 230 based on control data 831 stored in memory, as will be described in more detail hereafter. As an example, the control logic 832 may control the node 230 to transmit beacons and other information to the tags 510, receive tag reports from 510, and transmit the tag reports to the server 530 through the gateway 550 or otherwise. The control logic 832 may be implemented in hardware, software, or any combination thereof. In the embodiment depicted by FIG. 8, the control logic 832 is implemented in software, and instructions of the control logic 182 executed by the processor 820. In other embodiments, other configurations are possible.

Note that a beacon transmitted from a node 230 may communicate various information to tags. First, as will be discussed in more detail below, reception of a beacon by a tag 510 may indicate to the tag 510 that it is located at or near a facility 100 and, thus, control its operation accordingly. As an example, in response to a beacon, a tag 510 may enter into a mode in which the tag 510 awakens more frequently to communicate tag reports. Such a feature enables a tag 510 to conserve power when it is away from a storage facility 100 and not being tracked. A beacon may also indicate control information, such as identify one or more channels (e.g., firmware update channels, configuration update channels, tag reporting channels) used at the facility 100 or other storage location. Such a feature can eliminate the need for a tag to waste power searching for channels to be used by the tag. A beacon may carry other information that is used by the tags 510 in operation.

Figure 9:
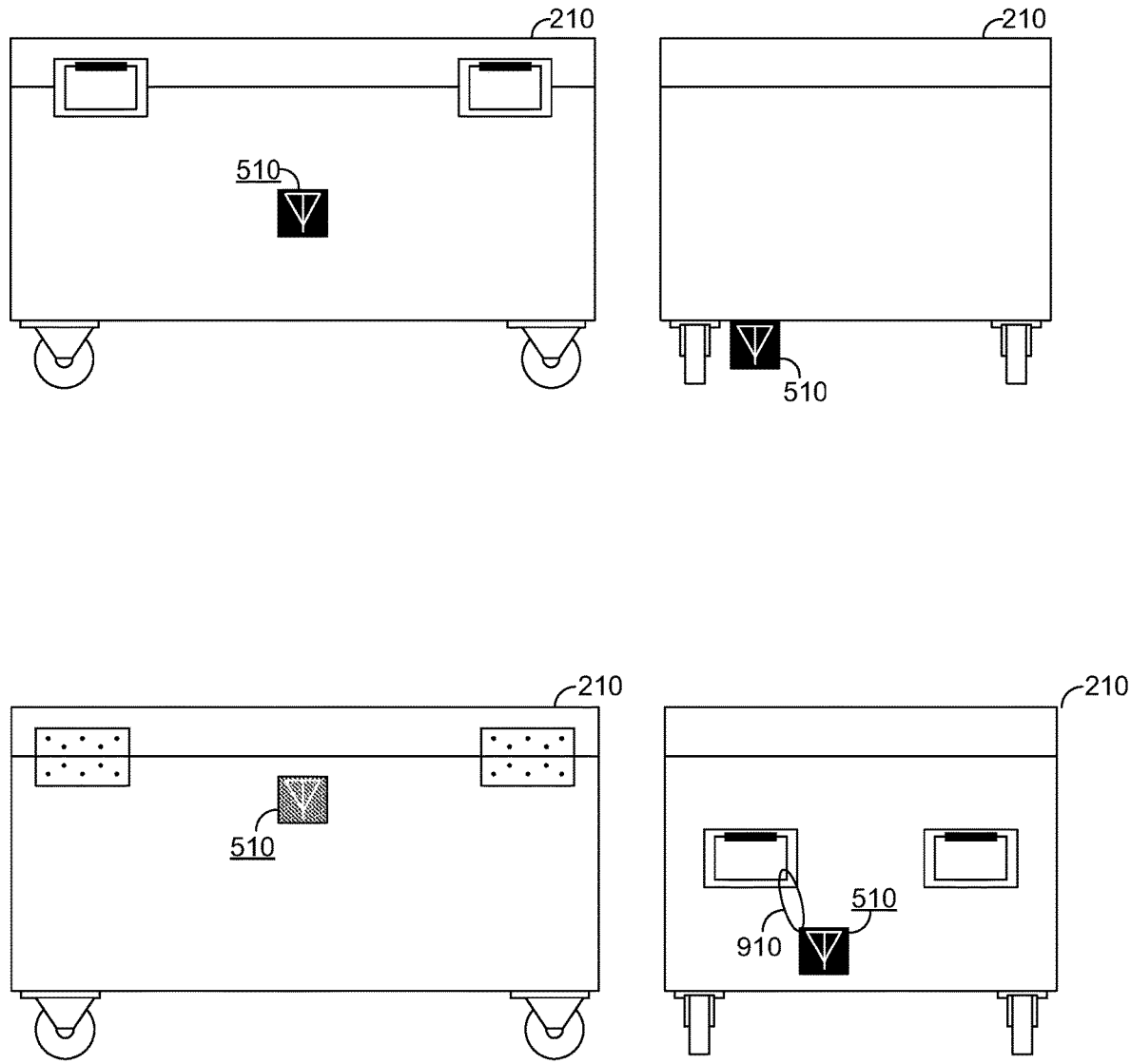
FIG. 9 is a diagram illustrating exemplary embodiments of an inventory item at an inventory storage facility.

Tags 510 can take a variety of form factors including a 25 mm×20 mm×12 mm (coin stack form factor), a 75 mm×20 mm×4 mm (thin tab form factor), or other form factors. As can be seen in FIG. 9, a small form factor allows tags 510 to be easily attached to a variety of surfaces of inventory items 210. Tags 510 can be affixed by adhesives, zip ties 910, or other types of coupling devices, and tags 510 can be inserted into slots or depressions or otherwise mounted on or affixed to inventory items 210. Tags 510 also may be embedded in or otherwise mounted on a case of an inventory item 210. Tags 510 may also have a barcode or QR code for additional identification. By way of example in FIG. 9, the upper left case may represent a tag affixed to the outside of a case of an inventory item 210 or inserted into a slot or depression on the case's exterior. The tag 510 in the upper right has been affixed underneath the case between two of the case's wheels. The difference in shading of the lower left tag in FIG. 9 is intended to represent that the tag is inside the case. The tag 510 in the lower right portion of the figure is hanging by a zip tie 910 to a case's handle. These are shown by way of example and many other ways exist to attach a tag 510 to an item 210.

Figure 10:
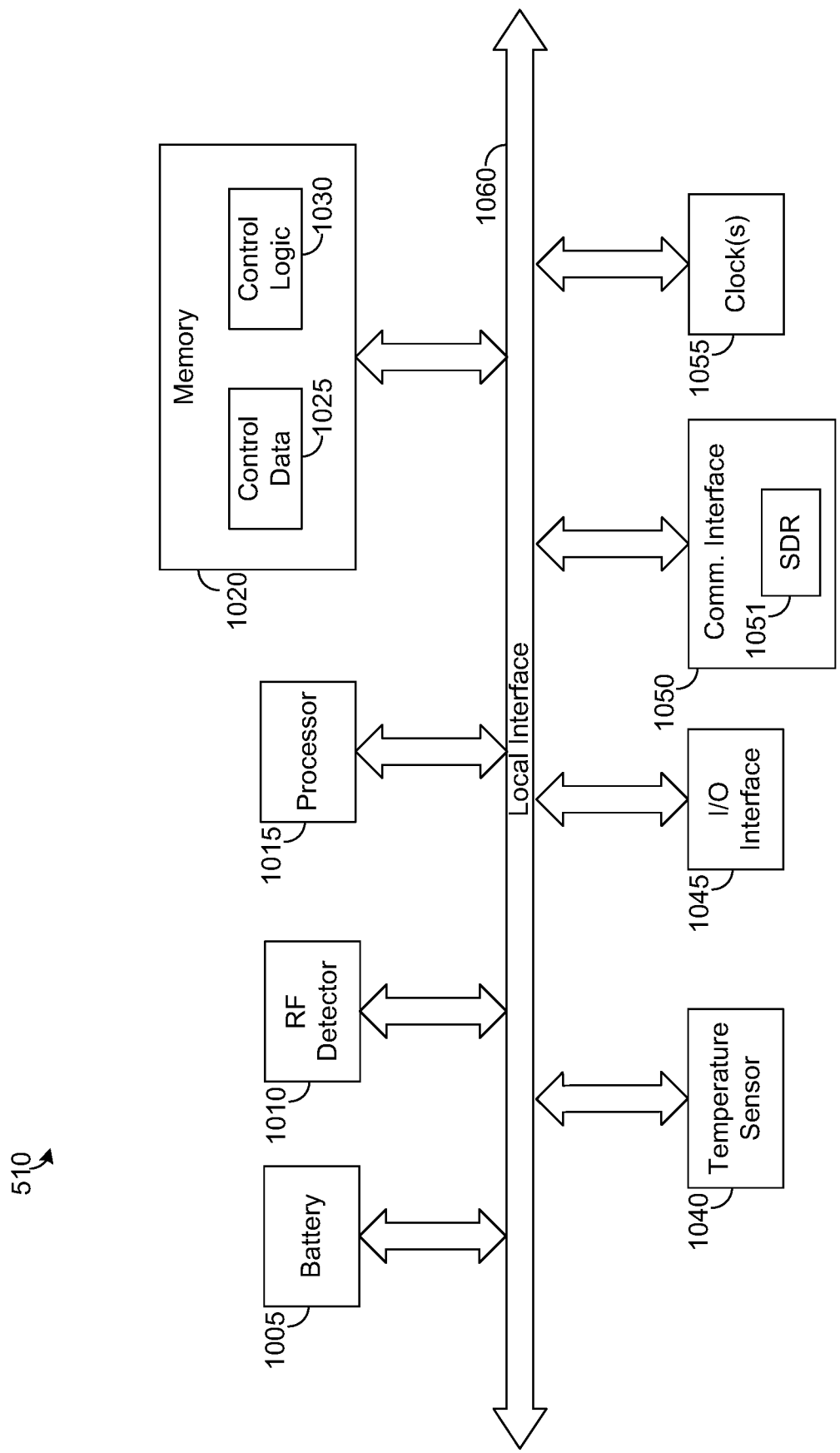
FIG. 10 is a block diagram illustrating an exemplary embodiment of a tag, such as depicted by FIG. 5.

FIG. 10 depicts an exemplary embodiment of a tag 510. The tag 510 shown by FIG. 10 has at least one battery 1005, radio frequency (RF) detector 1010, processor 1015, memory 1020, temperature sensor 1040, input output (I/O) interface 1045, communication interface 1050, clock 1050, and local interface 1060. The battery 1005 provides power to the other electrical components of the tag 510. In one embodiment, the battery 1005 comprises a lithium-metal cell, such as a CR2032MFR from Renata at 3 Volts (V), which has about 225 mA-hours of life, but other types of batteries may be used in other embodiments. The RF detector 1010, as will be discussed in more detail later, detects a threshold amount of RF radiation and, when enabled, sends an interrupt or other type of message to wake the tag 510 out of sleep mode. The tag 510 has control logic 1030 that is configured to control the operation of the tag 510 based on control data 1025 stored in memory 1020, as will be described in more detail below. The control logic 1030 may be implemented in hardware, software, or any combination thereof. In the embodiment depicted by FIG. 10, the control logic 1030 is implemented in software, and instructions of the control logic 1030 are executed by the processor 1015. In other embodiments, other configurations are possible.

The temperature sensor 1040 detects a temperature of the tag 510 and reports data indicative of such temperature to the processor 1015. In some embodiments, the temperature sensor 1040 may directly sense the temperature of the battery 1005 or other component of the tag 510. In other embodiments, the temperature sensor 1040 may sense the ambient temperature of the air around the tag 510. As will be described in more detail hereafter, the control logic 1030 is configured to make decisions about whether to transmit messages from the tag 510 based on the detected temperature.

The communication interface 1050 is configured to transmit and receive wireless signals. In this regard, the communication interface 1050 may comprise one or more wireless radios, such as an RF radio, for communicating on one or more wireless channels. Each radio may include a wireless transmitter for transmitting wireless signals from the tag 510 and a wireless receiver for receiving wireless signals by the tag 510. In one embodiment, the communication interface 1050 comprises a software-defined radio (SDR) 1051. As an example, the SDR 1051 may be implemented via an EFR32™ FLex Gecko chip sold by Silicon Labs. Using such an SDR 1051, it is possible to design a tag 510 to consume less than about 100 nano-Amps (nA), such as about 60 nA (i.e., about 180 nano-Watts (nW) of power) or less, while in a sleep state. In other embodiments, other types of devices may be used for the communication interface 1050.

To help ensure reliable communication without significantly compromising battery life, various design parameters for the communication interface 1050 may be controlled to optimize communication to achieve a relatively long range with relatively small power consumption. Specifically, the tags 510 may be configured to utilize a modulation scheme that has a relatively low data rate and a relatively wide bandwidth for the amount of data being communicated in order to increase the range of the transmitted signal without significantly increasing power. Thus, a relatively low amount of power may be consumed in order to wirelessly transmit a signal with a sufficiently long range in order for the signal to be heard by nodes 230 that are relatively far away (e.g., tens of feet above the tags 510) even when the tags 510 are buried under several inventory items 210, such as cases typically used for the storage and transport of theatrical lights and other equipment. Further, in the instant application, the amount of data sent to the nodes 230, such as tag reports, may be low so that the relatively low data rate provided by the selected modulation scheme should not be an operational problem for the tags 510 or require the tags to remain awake unreasonably long to transmit tag reports.

In some embodiments, the modulation scheme is designed to be operable at a relatively high frequency, such as about 1.0 Giga-Hertz (GHz) or higher. In one embodiment, the SDR 1051 is configured to transmit about 2.4 GHz, but other frequency ranges are possible. Such high-frequency ranges have traditionally been avoided in many conventional asset tracking systems due various challenges, including lesser signal penetration relative to frequencies in the sub-GHz range. Specifically, the modulation scheme may be designed to have a relatively long range, as described above, thereby increasing the range of the tag 510 to be able to successfully communicate with nodes 230 at a relatively high frequency, such as about 2.4 GHz or higher, even when the tag 510 is coupled to an inventory item buried under several other inventory items. Further, this may be achieved at a relatively low transmission power, thereby extending the life of the tag's battery. An exemplary modulation scheme for achieving these goals will be described in more detail below.

In this regard, for illustrative purposes, as shown by FIG. 10, the communication interface 1050 may comprise an SDR 1051 that is configured to communicate at 2.4 GHz, though other types of radios and communication bands are possible in other embodiments. Note that using such a high frequency allows for further miniaturization of the components of the communication interface, relative to radios using modulation schemes at lower frequencies, such as sub-GHz. This miniaturization helps to reduce the costs and the power requirements of the SDR 1051 and, thus, the communication interface 1050. The SDR 1051 may be configured to transmit any of the messages described herein as being transmitted by a tag.

In some embodiments, the SDR 1051 is implemented on a small, inexpensive RF integrated circuit (RFIC). Further, the SDR 1051 divides the 2.4 GHz band into a small number of sub-bands, where each sub-band provides a different channel to be used by the SDR 1051. Thus, each sub-band may be relatively wide to permit improved range. In some embodiments, the channel is divided into 16 equally-sized sub-bands or channels from about 2400 Mega-Hertz (MHz) to about 2483.5 MHz where channel spacing is about 5 MHz. Further, the bandwidth of each channel is about 1 MHz, though other bandwidths are possible, such as for example about 0.5 MHz or more or a frequency less than 0.5 MHz. Note that relatively higher channel spacing helps to reduce interference. The 1 MHz channel bandwidth is selected as a tradeoff between channel spacing and signal-to-noise ratio (SNR). That is, greater channel spacing helps to reduce interference between channels, and greater channel bandwidth (which reduces channel spacing for a given band) increases SNR. Further, in some embodiments, the modulation type of the SDR 1051 is O-QPSK w/DSSS, similar to I.E.E.E. 802.15.4 for Zigbee, and each channel employs a bit rate of less than about 200 kilo-bits-per-second (kbps), such as approximately 125 kbps. A low bit rate, such as less than about 200 or 150 kbps, helps to improve the signal-to-noise ratio (SNR), relative to bit rates of conventional systems, so that the signal can be successfully transmitted across a longer distance. In the system 500, each tag 510 is configured to wake up from time-to-time to transmit a small amount of data, so the relatively low bit rate does not materially affect performance in an adverse manner. To help mitigate for interference and data collisions, the messages transmitted by the tags 510 include cyclic redundancy check (CRC) bits that may be used to correct errors in received packets.

Moreover, by controlling the modulation scheme as described above or similar thereto, it is possible for the range of the SDR 1051 to be over 100 meters (e.g., about 150 meters or more) in free space (e.g., no obstructions) with the SDR 1051 consuming very little power. In some embodiments, the modulation scheme is defined such that the SDR 1051 consumes less than about 20 milli-Amps (mA) or about 42 milli-Watts (mW) of power, when actively communicating. Indeed, it has been shown that an SDR radio 1051 designed to communicate between 2.4 GHz and 2.5 GHz at approximately 125 kbps at a bandwidth of about 1 MHz with channel spacing of at least about 5 MHz consumes about 14 mA or less. In other embodiments, other communication parameters and modulation schemes may be used. As an example, it is possible for the frequency range to be between about 900 MHz and 1 GHz, or lower.

In addition, to optimizing design parameters of the communication interface 1050, there are other power conservation principles that can be employed to extend the life of the tag's battery 1005. In this regard, there are generally three types of events that can have a disproportionate adverse effect on battery life: drawing too much power, drawing power too fast, and drawing power at adverse temperature extremes. These events not only consume power, but also can damage battery cells such that the effective power loss is greater than just the power used to perform these actions.

To avoid or limit the effects of these damaging uses, a variety of techniques can be used which are useful individually but even more so when used together. Specifically, the tag 510 may be designed to have a sleep state that draws very little power. The 510 may be configured to stay in the sleep state for long periods of time waking temporarily to perform certain functions, such as listening for beacons and transmitting tag reports, and then going back to sleep. The longer that the tag 510 can be kept in the sleep state, the longer that the tag's battery life is extended. In addition, certain functions or components may be disabled when the temperature detected by the temperature sensor 1040 is within a certain range (e.g., above or below a threshold indicating that the temperature is at a level that could disproportionately drain or damage the battery if an attempt is made to draw a relatively significant amount of power from the battery). As an example, the tag 510 may be kept in a sleep state for a longer period of time based on temperature (e.g., the duration of the tag's sleep state for a given awake/sleep cycle may be extended) or certain functions (such as communicating via the communication interface 1050) may be disabled or limited based on temperature. Various techniques for conserving battery life based on temperature will be described in more detail below.

In this regard, as indicated above, drawing power from many types of batteries when it is extremely hot or cold can damage one or more cells of the battery. Such damage can affect the total amount of power available from the battery, thereby shortening battery life. This damage can be effectively prevented or reduced by limiting power consumption during adverse temperature conditions. In addition, in cold environments, a given operation may consume more power relative to performance of the same operation in warmer environments. Thus, limiting certain operations based on temperature may have a pronounced effect in conserving the power resources of a tag 510 over time.

In some embodiments, each tag 510 is configured to take actions to limit or otherwise reduce power consumption during periods of extreme temperature. In this regard, the control logic 1030 is configured to determine when the temperature measured by the temperature sensor 1040 is in a certain range, such as above an upper threshold or below a lower threshold. When such a condition is detected, the control logic 1030 enters into an operational mode, referred to hereafter as "extreme temperature mode," for limiting or otherwise reducing power consumption. In such a mode, the control logic 1030 may disable or limit certain functions from occurring. As an example, the control logic 1030 may keep components of the communication interface 1050 in a sleep state for longer periods of time.

In this regard, powering the components of the communication interface 1505, such as a transmitter or receiver, can consume a significant amount of power. As described in more detail herein, the tag 510 may be configured to normally awaken from a sleep state, power the communication interface 1050, and use the communication interface to attempt communication with one or more nodes 230 before returning to the sleep state. In some embodiments, the tag 510 may be configured to awaken periodically, such as every fifteen minutes or some other time period. When operating in the extreme temperature mode, the control logic 1030 may be configured keep the communication interface 1050 in the sleep state, thereby disabling communication between the tag 510 and the nodes 230, until the control logic 1050 exits the extreme temperature mode, such as when the temperature detected by the temperature sensor 1040 falls below the upper threshold or rises above the lower threshold.

As an example, each time the processor 1015 awakens from a sleep state, the control logic 1030 may be configured to check the temperature sensor 1040 to see if an extreme temperature is detected. If so, the control logic 1030 may control the tag 510 such that the processor 1015 returns to the sleep state without performing at least some functions that would be normally performed, such as powering the communication interface 1050. Thus, using the communication interface 1050 is effectively disabled until a normal operating temperature is detected.

Alternatively, rather than disabling communication entirely, the control logic 1030 may be configured to reduce the amount of time that the communication interface 1050 is powered during the extreme temperature mode. As an example, the control logic 1030 may be configured to increase the time between consecutive awake/sleep cycles. For example, if the tag 510 and, specifically, the processor 1015 are normally configured to awaken every 15 minutes and attempt communication with the node 230, the control logic 1030 may change the configuration of the tag 510 in the extreme temperature mode such that the tag 510 and specifically the processor 1015 awaken every 30 minutes (or some other time period) rather than 15 minutes, thereby reducing the number of awake/sleep cycles by one-half or other factor. In other embodiments, other techniques for reducing power consumption by the tag 510 during the extreme temperature mode are possible, and other components may be similarly controlled to reduce their power consumption based on temperature.

Figure 11:
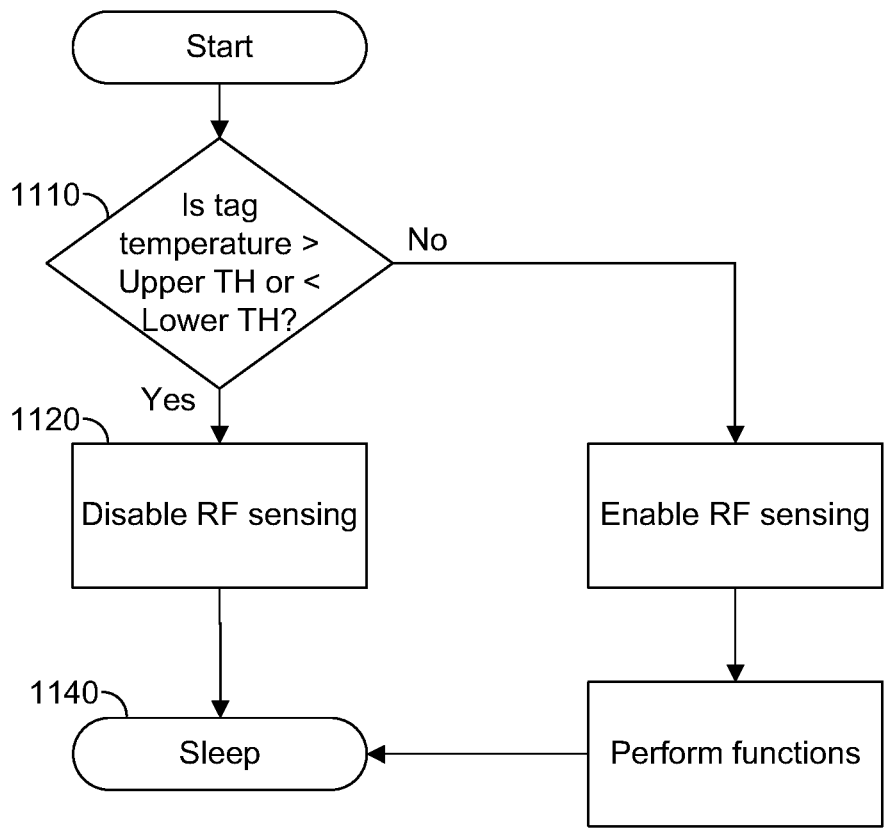
FIG. 11 is a flowchart illustrating an exemplary method for controlling a tag based on temperature.

FIG. 11 depicts an exemplary method that may be used to reduce power consumption in response to a detection of a temperature in a certain temperature range. Upon waking, the processor 1015 may execute instructions from control logic 1030 in step 1110 to determine whether the temperature detected by the temperature sensor 1040 is above a predefined upper threshold (TH) or below a predefined lower threshold. If so, control passes to step 1120, otherwise control passes to step 1150. At step 1150, the control logic 1030 enables RF sensing (which will be described in more detail below) and then performs various normal functions in step 1160, such as attempting communication with one or more nodes 230, before returning to the sleep state in step 1140.

However, if the detected temperature is above the upper threshold or below the lower threshold, the control logic 1030 is configured to disable RF sensing (which will be described in more detail below) in step 1120 before returning to the sleep state. Thus, the tag 510 may awaken only to the extent necessary to check the temperature before performing other functions. Notably, many components may remain in the sleep state during performance of steps 1110 and 1120. As an example, the communication interface 1050, which consumes a significant amount of power may remain in the sleep state unless a "no" determination is made in step 1110 such that the communication interface 1050 is not powered if an extreme temperature is detected. Thus, certain events that consume significant power may be disabled or limited during adverse temperature conditions. Therefore, the power consumed during extreme conditions may be reduced helping to prevent or reduce damage to the tag's battery 1005 and extend battery life.

Note that the above example may be implemented by awaking the processor 1015 so that the processor 1015, by executing instructions of the control logic 1030, performs the steps shown by FIG. 11. However, it is possible for the method shown by FIG. 11 to be performed without waking the processor 1015. As an example, the temperature sensor 1040 may be coupled to a circuit that provides a signal to the processor 1015 for enabling or disabling the processor 1015 based on the temperature sensed by temperature sensor 1040. If the temperature is in a certain range, such as above the upper threshold or below the lower threshold, then the circuit may disable the processor 1015 so that it remains in a sleep state. Once the temperature returns to a normal range, the circuit may enable the processor 1015 thereby permitting the processor 1015 to awaken and perform its normal functions, as described herein.

In some embodiments, the duration of the sleep period is on a graduated scale where temperatures closer to an operationally safe temperature range have a shorter sleep period. As an example, the timing of the awake/sleep cycles may be controlled such that the duration of a sleep state (i.e., the time between consecutive awake states) may be longer the further the detected temperature is from a normal range. As an example, if the measured temperature is in a normal range, the duration of sleep states may be controlled to be x. If the measured temperature is outside the normal range and is between a first threshold and a second threshold, the duration of the sleep states may controlled to be y. Further, if the measured is outside of the normal range and is between the second threshold and third threshold, the duration of the sleep states may be controlled to be z, where $x>y>z$. For example, the colder that the temperature gets below a lower threshold, the duration of the sleep state may increase in order to reduce the number of times that one or more components of the tag 510 transition to the awake state.

Tags 510 may be programmed to enter different states for different reasons depending on various factors. In an exemplary embodiment, a tag 510 may be configured to have the following states, which will be described in more detail herein: Inside, Exiting, Entering, Outside, RF Sense, Configuration Update, and Firmware Update. Generally state data may be stored by the tag 510, and when the tag awakens, it can read the state data to determine which state it is in, perform a number of tasks based on its state, update the state data as appropriate, and then return to sleep in order to conserve power.

The tag 510 is configured to control the state data to indicate that it is in the Inside state when it has recently received a message from a node 230 indicating that the tag 510 is in range of the nodes 230 and thus likely in the facility 100 or other storage location where tags 510 are being tracked. A tag 510 that is in the Inside state, but has stopped receiving beacon messages from the nodes 230 will switch from the Inside state to the Exiting state after missing a predetermined number of beacons from nodes 230, or after not hearing a beacon for a predetermined period of time. In the Exiting state, the tag 510 may change how often it attempts communication or how long it remains in the sleep state during an awake/sleep cycle. As an example, if the tag 510 is configured to awaken every 30 minutes in the Inside state and attempt to send a tag report to nodes 230, the tag 510 might change its configuration so that it awakens more frequently, such as every 15 minutes instead of 30. After a certain amount of time (e.g., one hour or some other period)

in the Exiting state without hearing a beacon, the tag may switch to the Outside state indicating that the tag 510 is likely no longer in range of the nodes 230 and thus is no longer likely in the facility 100 or other storage location where tags 510 are being tracked.

In the Outside state, the tag 510 may awaken less frequently to listen for a beacon from a node 230 in order to conserve power. As an example, if the tag 510 is configured to awaken every 30 minutes in the Inside state and 15 minutes in the Exiting state, as described above, the tag 510 might awaken every 30 minutes or an hour and listen for beacon while in the Outside state. In other embodiments, the duration of the tag's sleep cycle may be controlled based on state data in other ways.

In some embodiments, each time a tag 510 awakens while in the Outside state, the tag 510 may listen on multiple channels for a beacon from a node 230. In this regard, at some point, the tag 510 may be taken back to the facility 100 or other storage location from which it was removed, or the tag 510 may be taken a new facility 100 or other storage location that uses a different channel for node beacons. As an example, as described above, the communication interface 1050 may have a tunable receiver that can be controlled to listen on different channels, and the control logic 1030 may control the receiver to cycle through different predefined channels and listen on each channel for at least a predefined time period. Alternatively, the tag 510 can try a different channel or a subset of channels on each wake. In other embodiments, the communication interface 1050 may have multiple receivers for simultaneously listening on different channels.

If a valid beacon is heard while in the Outside state, the tag 510 may be configured to log relevant channel information indicative of the channel on which the beacon was heard, and the tag 510 may enter the Entering state indicating that the tag 510 is in range of a node 230 and thus likely has arrived at a facility 100 or other storage location where tags 510 are being tracked. During the Entering state, the tag 510 may awaken more frequently to listen for beacons and attempt communications with nodes 230. Increasing the rate of communication attempts in the Entering state helps to ensure relatively quick detection of the tag 510 at the facility 100 or other storage locations where tags 510 are being monitored. As an example, while in the Entering state, the tag 510 may awaken, listen for a beacon, and attempt communication with a node 230 (e.g., issue a tag report) every 5 minutes or some other time period. If the tag 510 continues to hear beacons for a predefined amount of time (e.g., an hour) or hears at least a predefined number of beacons within a certain time period, the tag 510 may switch to the Inside state indicating that the tag 510 is likely at the facility 100 or other storage location where tags 510 are being tracked. If the tag 510 does not hear a beacon for a predefined amount of time or hears less than a predefined number of beacons within a certain time period while in the Entering state, then the tag 510 may transition back to the Outside state.

In the Inside state, the nature and mode of tag behavior may be set to a regular schedule. As an example, the tag 510 may awaken every 15 minutes and listen for a beacon, perform certain functions, such as update its configuration based on a received beacon or information from a node 230, and return to the sleep state. Every 30 minutes or every other awakening, the tag 510 may also transmit a tag report for reception by one or more nodes 230. Alternatively, in the Inside state, tag behavior may be controlled by the beacon or other information from a node 230. For instance the beacon or other information from a node 230 may instruct the tag 510 to alter or otherwise define its sleep pattern and/or reporting pattern.

In this regard, the system at the facility 100 or other storage location may have different modes of operation for which it is desirable for the tags 510 to adjust their sleep pattern based on such modes of operation. As an example, the system may operate in an inactive mode for which it is desirable to reduce communication between the nodes 230 and the tags 510 in order to conserve power at the tags 510. Such a mode may occur at night or other time period when it is unlikely that the inventory at the facility 100 or other storage location will change. In such mode, the frequency at which the tags 510 transition to the awake state may be reduced, or the tags 510 may be instructed to remain in the sleep state for an extended period of time, such as several hours for example. Each tag 510 may be configured to update its settings to transition into and out of sleep states in accordance with the instructions from the nodes 230.

It should be emphasized that the different tag states described herein are exemplary, and other tag states may be employed in other embodiments.

Avoiding or reducing data collisions is important for both high scalability and low power requirements. In this regard, data collisions not only make reliable communication more difficult, but a large number of data collisions can also affect battery life since a tag 510 may consume power while trying to retransmit messages or otherwise engage in activities to ensure reliable communication. Many conventional systems use a form of carrier-sense multiple access (CSMA) protocol in an attempt to avoid data collisions. When attempting to transmit a message using such protocol, a node of a network first takes a measure of wireless energy in an effort detect traffic from another node. This is typically achieved using a receiver to provide a value, referred to as a received signal strength indicator (RSSI), indicative of the amount a received energy in the communication band. If the RSSI value exceeds a threshold, then the node detects the presence of traffic and refrains from transmitting the message so as to avoid a collision with the traffic already being transmitted by another node. The node then waits for a random period before attempting another transmission of the message. This act of waiting for a random period is sometimes referred to as a "random backoff." By utilizing random backoff, it is less likely that multiple nodes that have detected the same traffic will attempt to re-transmit at the same time.

In some embodiments, the control logic 1030 of the tag 510 is configured to utilize a similar CSMA protocol in an effort to avoid data collisions. However, in the context of the system 500 tracking inventory assets at a storage facility, quickness of transmission of a message is not likely as important of a consideration as it might be in some other applications, but power conservation can be extremely important. In an effort to conserve more battery power, the control logic 1030 is designed to perform random backoff in response to traffic in a way that permits the node 510 to transition to a sleep state longer than would be possible with many conventional CSMA protocols. In this regard, when the control logic 1030 is to attempt the transmission of a message, the control logic 1030 may interact with the communication interface 1050 to determine an RSSI value indicative of whether traffic from another source, such as another tag 510, is present, similar to conventional CSMA protocols described above. If traffic is present, the control logic 1030 may be configured to transition the tag 510 to a sleep state for a random interval, thereby implementing a type of random backoff, referred to hereafter as "sleepy random backoff," where the tag 510 waits for a random period before attempting to transmit the message again. Rather than remaining awake during this random period, the tag 510 instead is in a sleep state, thereby conserving battery power. Note that, since the tag 510 is in a sleep state, it is reasonable that the random intervals used for sleepy random backoffs could be longer than the random intervals used for conventional random backoffs. The use of the sleepy random backup helps to conserve power since the tag 510 is transitioned to a sleep state while waiting to make another attempt to transmit the message. Also, longer intervals for the sleepy random backoff may also help to better spread the messages from multiple nodes better thereby reducing the likelihood of data collisions. In addition, the sleepy random backoff also helps to decrease the duration that the tag 510 continuously remains in the awake state to attempt a transmission of a message by breaking the process up into multiple awake states with sleep states in between.

Note that, when implementing a sleepy random backoff, it is possible for a tag 510 upon transitioning out of a sleep state to attempt to transmit on the same channel on which it attempted to communicate prior transitioning into the sleep state. However, it is also possible for the tag 510 to attempt to communicate on another channel. As an example, in some embodiments, when a tag 510 is to communicate a message, it may randomly select a channel from a predefined set of channel (e.g., from a predefined set of tag reporting channels). In such an embodiment, the tag 510 randomly selects a channel from a predefined set of channels upon awakening from the sleep state during a sleepy random backoff and then attempts to transmit on the selected channel. Thus, once the tag 510 attempts to communicate a message on a first channel, detects traffic, and transitions to the sleep state in response to the traffic, it is possible for the same channel or a different channel to be used to attempt communication of the message after exiting the sleep state, depending on which channel is randomly selected after exiting the sleep state. In other embodiments, it is possible for the tag 510 to intentionally select the same first channel or intentionally select a different channel upon exiting the sleep state. In other embodiments, yet other techniques for selecting a channel to communicate a message are possible.

In some embodiments, power can also be conserved for at least some large tasks that could consume significant amounts of power. In this regard, at least some large tasks like firmware updates can be broken into a series of smaller tasks to allow them to be performed across multiple awake/sleep cycles so that the tag 510 is not required to remain continuously awake for an extended time. Tag states can store enough information between sleep cycles to allow the tag 510 to efficiently wake up to perform the next step in a task. When downloading content such as a firmware update to a group of tags 510, the packets can be sent in series during download timeslots that are repeated according to a calculable or otherwise determinable schedule allowing each tag 510 to wake up in time to listen to the next portion of the download, record it, and go back to sleep. This pattern is repeated until all portions have been received.

In one embodiment, firmware updates are transmitted on a channel separate from the beacon channel. Further, the firmware is divided into multiple packets that are transmitted to the tags 510 via the firmware update channel. In addition, the packets are transmitted serially and have a sequence number indicative of the packet's sequence. During a given awake/sleep cycle for a tag 510, the nodes 230 are configured to repetitively transmit the same packet. When a tag 510 transitions out of the sleep state, it is configured to listen for a beacon and possibly transmit a tag report as described above. If the tag's state data indicates that it is to receive a firmware update, the tag 510 also listens on the firmware update channel to receive a packet of the firmware update. After receiving the packet, the tag 510 may transition to the sleep state and receive the next packet of the firmware update upon the next awake/sleep cycle. Thus, the tag 510 receives one firmware update packet per awake/sleep cycle. In other embodiments, other numbers of firmware update packets may be received per awake/sleep cycle.

In the instant embodiment, the nodes 230 are configured to switch from transmitting the current firmware update packet to transmitting the next firmware update packet at the same rate that the tags 510 wake from the sleep state. Thus, if the tags 510 wake every fifteen minutes, then the nodes 230 switch to transmitting a new firmware update packet every fifteen minutes, and after switching, the nodes 230 continue transmitting the same new firmware update packet for the next fifteen minutes. Thus, each of the tags 510, which wake up asynchronously, should have the opportunity to receive the current firmware update packet before the nodes 230 switch to transmitting the next firmware update packet regardless of the tag's timing of its awake/sleep cycle relative to other tags 510.

In addition, once all packets of a firmware update are transmitted, the nodes 230 repeat the transmission of the firmware update. Thus, any tag 510 that missed a packet may listen for and receive the missing packet on the next transmission of the firmware update. Note that the tag 510 does not need to listen for every firmware update packet in such an example. In this regard, knowing the missing packet's sequence, the tag 510 can determine which awake/sleep cycle the missing packet should be transmitted and listen for the missing packet during such awake/sleep cycle. For the other awake/sleep cycles (during which the nodes 230 will transmit firmware update packets previously received by the tag 510), it is unnecessary for the tag 510 to listen for firmware update packets and may transition back to the sleep state sooner without listening on the firmware update channel. Of course, once the entire firmware update is received, the tag 510 may stop listening on the firmware update channel for all awake/sleep cycles until it receives another indication that a new firmware update is available.

As indicated above beacons from the nodes 230 may carry various information. In some embodiments, beacons may indicate when a firmware update for the tags 510 is available. Such information may include a firmware version number, and optionally which tags 510 or tag hardware versions should receive the update. The tags 510 not already operating on that firmware version and optionally identified as requiring the update may enter a Firmware Update state and download the firmware update, according to the techniques described above.

Specifically, in the Firmware Update state, a tag 510 may enter a pattern of (1) sleeping, (2) waking and listening on an update firmware channel for receiving one or more packets associated with the firmware update (note that this listening may occur when the tag 510 normally awakes for other functions, such as listening for a beacon and/or transmitting a tag report), (3) scheduling the next wake up time, and (4) returning to sleep. The packet header of the packets carrying the firmware for the update may include information that may be used to process the packet and the information carried by the packet, such as the firmware version number, packet number, a firmware size (indicating the total size of the firmware for the update), and an authentication code. Using the firmware size and the sequence number for the current firmware update packet received by the tag 510, the tag 510 can calculate when the next packet it needs will be broadcast and listen for such packet accordingly, as described above. In the above description, it is assumed that there is one firmware update packet transmitted per awake/ sleep cycle. However, any number of firmware update packets may be transmitted per awake/sleep cycle in other embodiments. As an example, the nodes 230 may transmit the packets for the firmware according to a predefined format, such as a certain number of firmware update packets each awake/sleep cycle. Thus, based on the packets transmitted in the last awake/sleep cycle, a tag 510 can determine which packets will be transmitted in the next awake/sleep cycle. Further, knowing the total size of the update, the tags 510 can determine when transmission of the current copy of the firmware will end and when transmission of the next copy of the firmware will begin.

In addition, in the examples described above, it is assumed that the firmware may be downloaded to the tag 510 while it still performs normal functions such as receiving beacons and transmitting tag reports. That is, on awakening, the tag 510 performs its normal functions and, if the tag's settings indicate that a firmware update is pending (i.e., the tag 510 is in the Firmware Update state), then the tag 510 listens for and receives a firmware update packet before returning to sleep. However, other configurations are possible. As an example, in the Firmware Update state, the tag 510 may schedule awakenings for receiving a firmware update packet without performing one or more normal functions, such as listening for beacons and transmitting tag reports.

Figure 12:
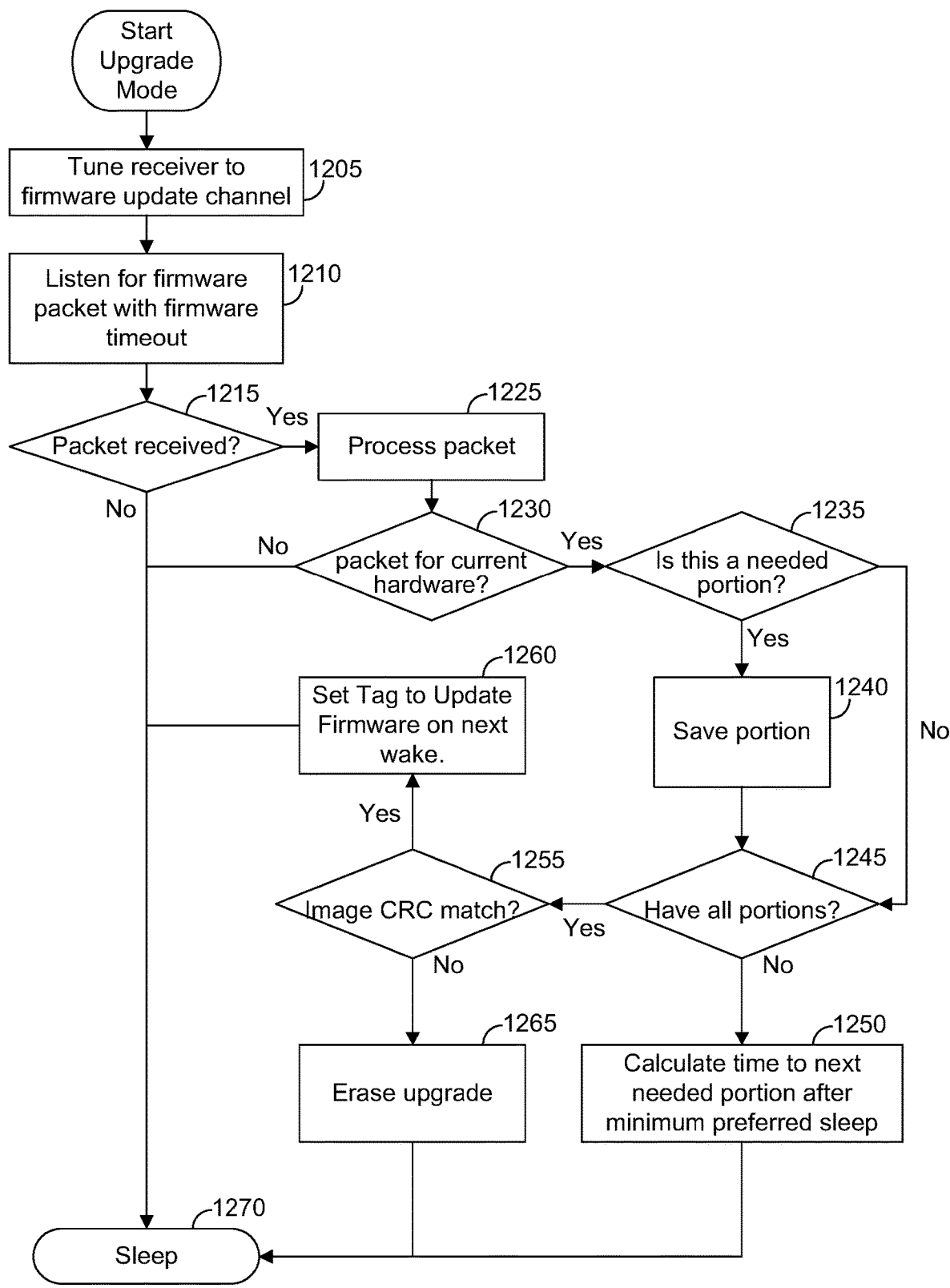
FIG. 12 is a flowchart illustrating an exemplary method for downloading a firmware update for a tag.

FIG. 12 depicts an example method for receiving a firmware update by a tag 510. After the tag 510 wakes up while in a Firmware Update state, the tag 510 tunes a receiver of the communication interface 1050 in step 1205 to the channel over which the firmware update is transmitted. The tag 510 then listens for a firmware packet for a preconfigured firmware timeout period at step 1210. At step 1215, if a firmware packet is received, the packet is processed in step 1225. At step 1230, the parsed packet is checked to see if the firmware's hardware identifier matches that of the tag. If so, control passes to step 1235.

At step 1235, the received packet is checked to see if it has already been downloaded to the tag 510. If not, control passes to step 1240 where the packet's payload (e.g., firmware portion) is saved. At step 1245, the tag 510 checks to see if all the firmware portions have been received. If so, control passes to step 1255. Otherwise control passes to step 1250. At step 1250, a calculation is made to when the next needed packet is to be broadcast, and the sleep interval is set so that the tag 510 awakens in sufficient time to receive this next packet. At step 1270, the tag 510 transitions to the sleep state.

If all portions of the firmware update have been received at step 1245, the new firmware image is verified by a cyclic redundancy check or other verification method at step 1255. If the image is verified, control passes to step 1260, otherwise control passes to step 1265. At step 1260, the tag's state is set such that the new firmware will be installed on the next wake, and tag 510 transitions to the sleep state. At step 1265, the downloaded firmware is erased, and the tag 510 goes to sleep.

Figure 13:
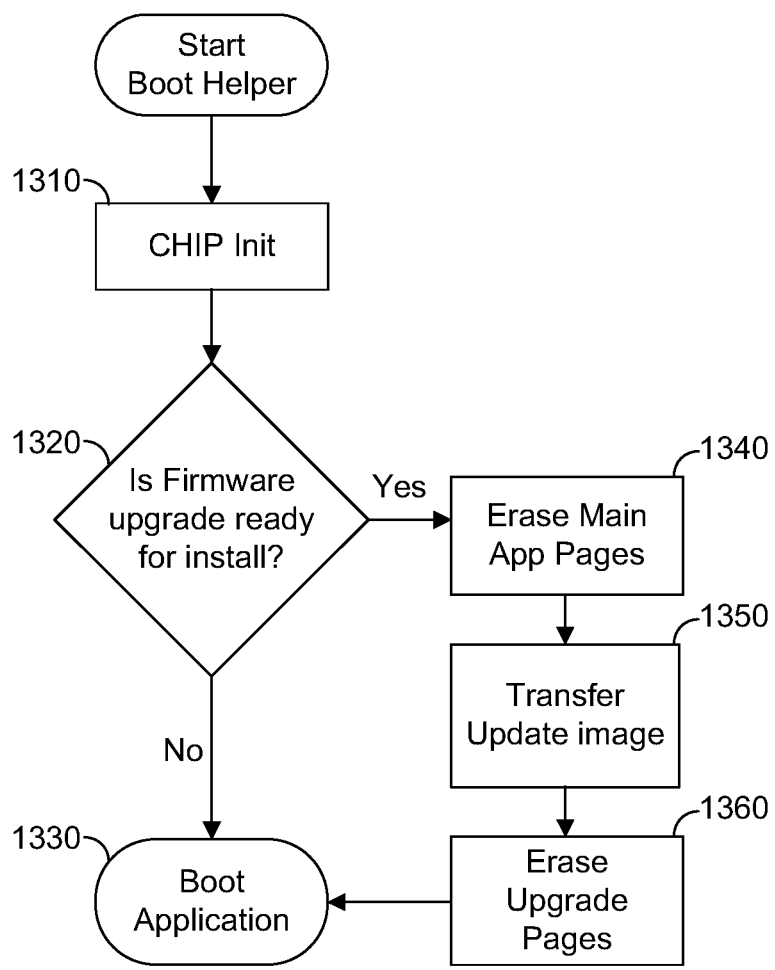
FIG. 13 is a flowchart illustrating an exemplary method for downloading a firmware update for a tag.

After firmware has been downloaded and verified, the tag 510 is set to install the firmware on the next wake. An example of a method for installing verified firmware is depicted by FIG. 13. On boot, a bootstrap or similar process may wake the processor 1015 at step 1310. At step 1320, the processor 1015 may check if a firmware update is ready to install. If not, control goes to step 1330. If so, control goes to step 1340 which erases the old firmware or main application pages and at step 1350 transfers the update image in place of the old firmware. At step 1360, the processor 1015 deletes the update pages which are now redundant. Control is then passed to step 1330 to boot the tag controller.

In some embodiments, the downloading of firmware updates may be disabled or postponed if the battery level is too low. In this regard, receiving a firmware update can consume a significant amount of power since the tag 510 may need to transition to the awake state over many cycles for the purpose of receiving a portion of the new firmware. In some embodiments, the battery 1005 may be configured to transmit a signal indicative of charge level in the battery 1005 or an amount of power available in the battery 1005. If the signal indicates that the amount of available power is below a threshold, the control logic 1030 may be configured to refrain from performing a firmware update until the signal indicates that the amount of available power exceeds the threshold, such as when the battery 1005 is replaced. Disabling firmware updates in this manner helps to extend the life of a battery 1005 with a low amount of charge.

Figure 15:
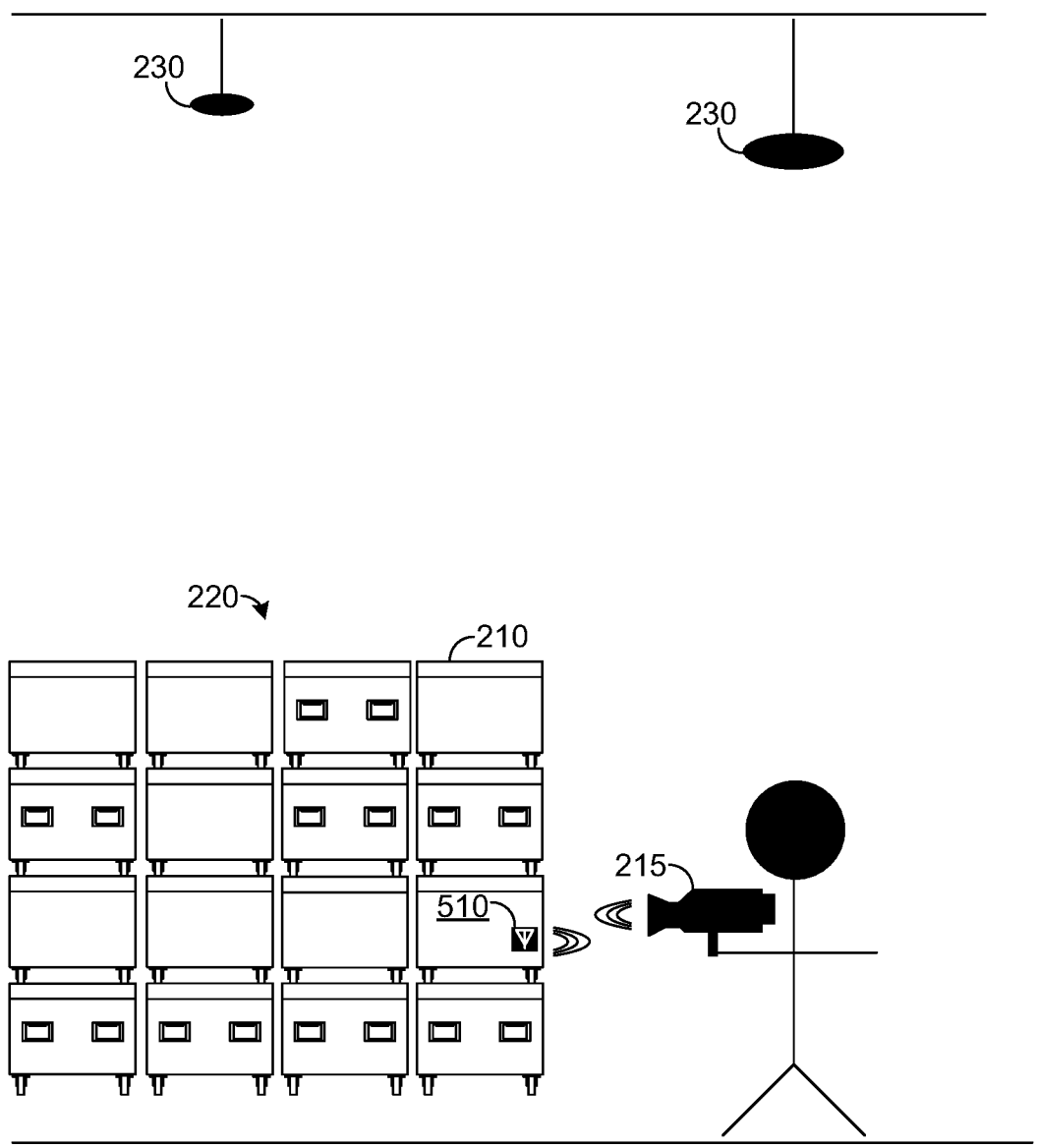
FIG. 15 illustrates a user using a mobile device to communicate with a tag activated by RF sensing.

In some embodiments, it may be desirable to trigger a tag report on demand using a mobile device 215 (FIG. 3 and FIG. 15), such as a mobile RF reader or smartphone. As an example, if a user wishes to find a particular inventory item 210, it may be desirable for the user to be able to cause the tag 510 of an inventory item 210 to transmit a tag report that can then be used to determine if such item 210 is the one sought by the user. In some embodiments, the RF detector 1010 is used to enable such functionality.

In this regard, the RF detector 1010 is configured to detect RF energy of a certain narrow frequency range. If the detected energy exceeds a predefined threshold, then the detector 1010 transmits a signal that wakes up one or more components of the tag 510 when the tag 510 is in a sleep state. In some embodiments, the signal from the RF detector 1010 may be used to interrupt or wake up the processor 1015, though other ways of processing the signal are possible in other embodiments. In addition, the mobile device 215 may be configured to wirelessly transmit a signal, referred to hereafter as the "RF sense signal," within the frequency range monitored by the RF detector 1010. Further, the threshold used by the RF detector 1010 may be defined such that it is exceeded when the mobile device 215 transmits the RF sense signal within a close proximity of the tag 510, such as a few inches or a few feet, for example, though other distances may be used in other embodiments.

Thus, to trigger a tag report from a particular inventory item 210, a user may bring the mobile device 215 close to the item's tag 510 and cause the mobile device 215 to transmit the RF sense signal. In response, the RF detector 1010 determines that its predefined threshold has been exceeded and transmits a signal indicative of such event, referred to hereafter as the "trigger signal." Note that the RF detector 1010 may be a passive or active device. If the detector 1010 is active, then it remains powered when the tag 510 is in a sleep state. If the detector 1010 is passive, it may be powered by the RF sense signal from the mobile device 215 for the purpose of generating the trigger signal that is transmitted by the detector 1010. In such embodiment, the RF detector 1010 does not consume power from the battery 1005 and thus remains operational irrespective of whether the tag 510 is in a sleep state.

In response to the trigger signal, the control logic 1030 is configured to wirelessly transmit a tag report via the communication interface 1050. If the tag 510 is in a sleep state, the trigger signal may awaken one or more components of the tag 510 so that a tag report can be generated. As an example, assume that the processor 1015 and communication interface 1050 are powered down when the tag 510 is in a sleep state. In such embodiment, the trigger signal transmitted by the RF detector 1010 may be received by and awaken the processor 1015, which then executes instructions from the control logic 1030 for processing the trigger signal. In processing the trigger signal, the processor 1015 may awaken the communication interface 1050 and cause the communication interface 1050 to transmit a tag report.

In some embodiments, the tag report may be received by the mobile device 215, which may then display or otherwise output information from the tag report so that the user of the mobile device 215 may identify the inventory item 210 that is coupled to the tag 510. Such an embodiment requires the mobile device 215 to be able to communicate with the communication interface 1050. In some embodiments, the mobile device 215 may be unable to communicate with the communication interface of the tag 510 but be able to communicate with the nodes 230. As an example, in one embodiment, the mobile device 215 may be implemented by a smartphone or other similar cellular device that is configured to emit an RF signal (e.g., a Bluetooth or other type RF signal) within the frequency range monitored by the RF detector 1010 but incapable of communicating directly with the communication interface 1050 of the tag 510. In such embodiment, however, the mobile device 215 may be able to communicate with the nodes 230 directly (e.g., using WI-FI or some other type of signal) or communicate with the nodes 230 through the network 540. As an example, the mobile device 215 may access the Internet using a cellular connection and communicate with the nodes 230 through the Internet. In other embodiments, other techniques and configurations for enabling communication between the mobile device 215 and the nodes 230 are possible.

In the instant embodiment in which the mobile device 215 can communicate with the nodes 230 but not the communication interface 1050 of the tag 510, the tag report generated in response to the RF sense signal from the mobile device 215 may be received by a node 230 and transmitted from the node 230 to the mobile device 215, which may then display otherwise use the information from the tag report, as described above. Thus, for such an embodiment, it is possible to repurpose an existing smartphone or other similar communication device for use to interact with the tags 510 to trigger tag reports on demand without having to change the hardware resources of the mobile device 215. In this regard, the mobile device 215 may be so repurposed by downloading an application into the device 215 for using the existing hardware resources of the device 215 to perform the functions described above for the mobile device 215.

Note that false detections of an RF sense signal can cause the tag 510 to consume power in a wasteful manner. For example, it is possible for the tag 510 to be placed close enough to an RF noise source such that the predefined threshold used to sense an RF sense signal is exceeded by RF noise such that the RF detector 1010 transmits a trigger signal when, in fact, an RF sense signal has not been received from a mobile device 215. In such a situation, one or more components of the tag 510 may be awakened or otherwise consume additional power in order to process the trigger signal. In some embodiments, the tag 1050 is configured to determine when false detections are being made by the RF detector 1010 to prevent these false detections from needlessly consuming power in at least certain situations, thereby reducing the effect of an RF noise source on the power resources of the tag 510.

In some embodiments, false detections by the RF detector 1010 are determined through the use of confirmation messages that are transmitted to the tag 510 to confirm that a valid RF sense signal has been transmitted to it. As an example, after transmitting an RF sense signal, the mobile device 215 may be configured to wait a predefined time period (sufficient for ensuring that a tag 510 receiving the RF sense signal has awakened in response to the RF sense signal) and then transmit a confirmation message confirming that a valid RF sense signal was just previously transmitted. Upon receiving the RF sense signal, the tag 510 may be configured to awaken various resources, such as the processor 1015 and/or the communication interface 1050, as described above, (if the tag 510 is in a sleep state) and listen for a confirmation message.

If such a confirmation message is received within a predefined time of the RF sense signal, then the control logic 1030 may confirm that the detection of the RF sense signal by the detector 1010 is valid. However, if a confirmation message is not received in the predefined time period, the control logic 1030 may determine that the detection by the RF detector 1010 is invalid (e.g., from an RF noise source). In such case, the control logic 1030 may perform various actions to conserve the power resources of the tag 510.

As an example, the control logic 1030 may refrain from transmitting a tag report. The control logic 1030 may also be configured to update its configuration settings in order to disable the RF detector 1010 for at least a period of time in order to prevent future false detections. As an example, the configuration settings of the processor 1015 may be controlled to ignore a trigger signal from the RF detector 1010. Thus, if the RF detector 1010 generates a trigger signal in the future, the processor 1015 is not awoken and no attempt is made to transmit a tag report, thereby conserving the power resources of the tag 510. Alternatively, configuration settings for the RF detector 1010 may be controlled to disable the RF detector 1010 from transmitting a trigger signal. Such disabling of RF sensing through the detector 1010 (whether through the configuration settings of the processor 1015, the RF detector 1010, or otherwise) may continue for a predefined time period (at which point the RF sensing may be enabled), or the RF sensing may later be enabled when the tag 510 transitions out of its current sleep state for other reasons. In other embodiments, the RF sensing may be enabled at other times.

Figure 16:
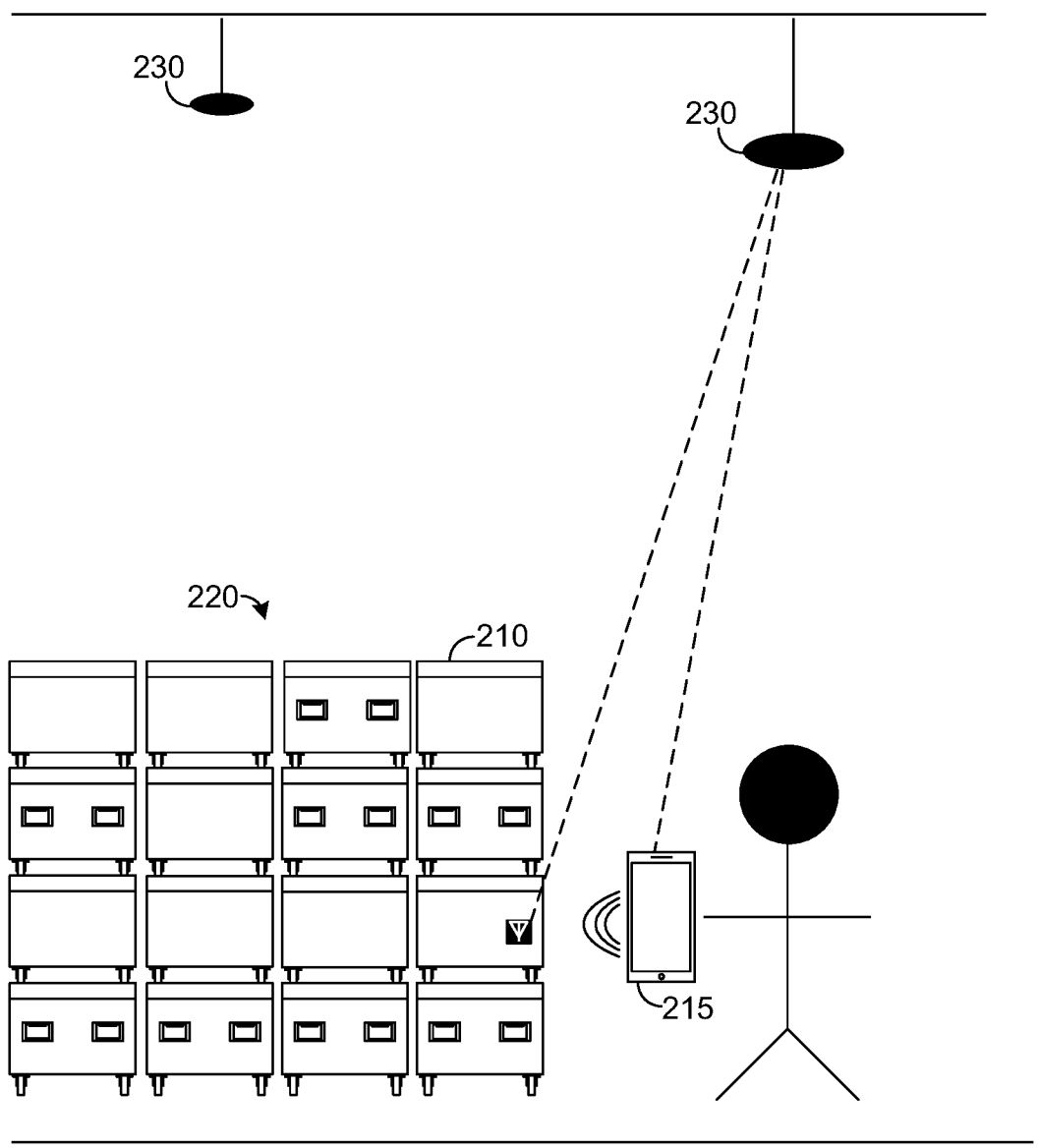
FIG. 16 illustrates a user using a mobile device to communicate with a tag activated by RF sensing.

In some embodiments, such as when the mobile device 215 is not configured for communication with the communication interface 1050 of the tag 510, the nodes 230 may be configured to transmit confirmation messages that are used by the tags 510 to confirm RF sensing events. In this regard, referring to FIG. 16, when the mobile device 215 transmits an RF sense signal for reception by a tag 510, the mobile device 215 may transmit a message to one or more nodes 230 requesting the node 230 to communicate a confirmation message that can be received by the tag 510. Such confirmation message may be received and processed by the tag 510 as described above for the confirmation message transmitted by the mobile device 215. Thus, a similar process may be used by the tags 510 to detect valid RF sensing signals regardless of whether confirmation messages are transmitted by the mobile device 215 or by nodes 230.

Figure 14:
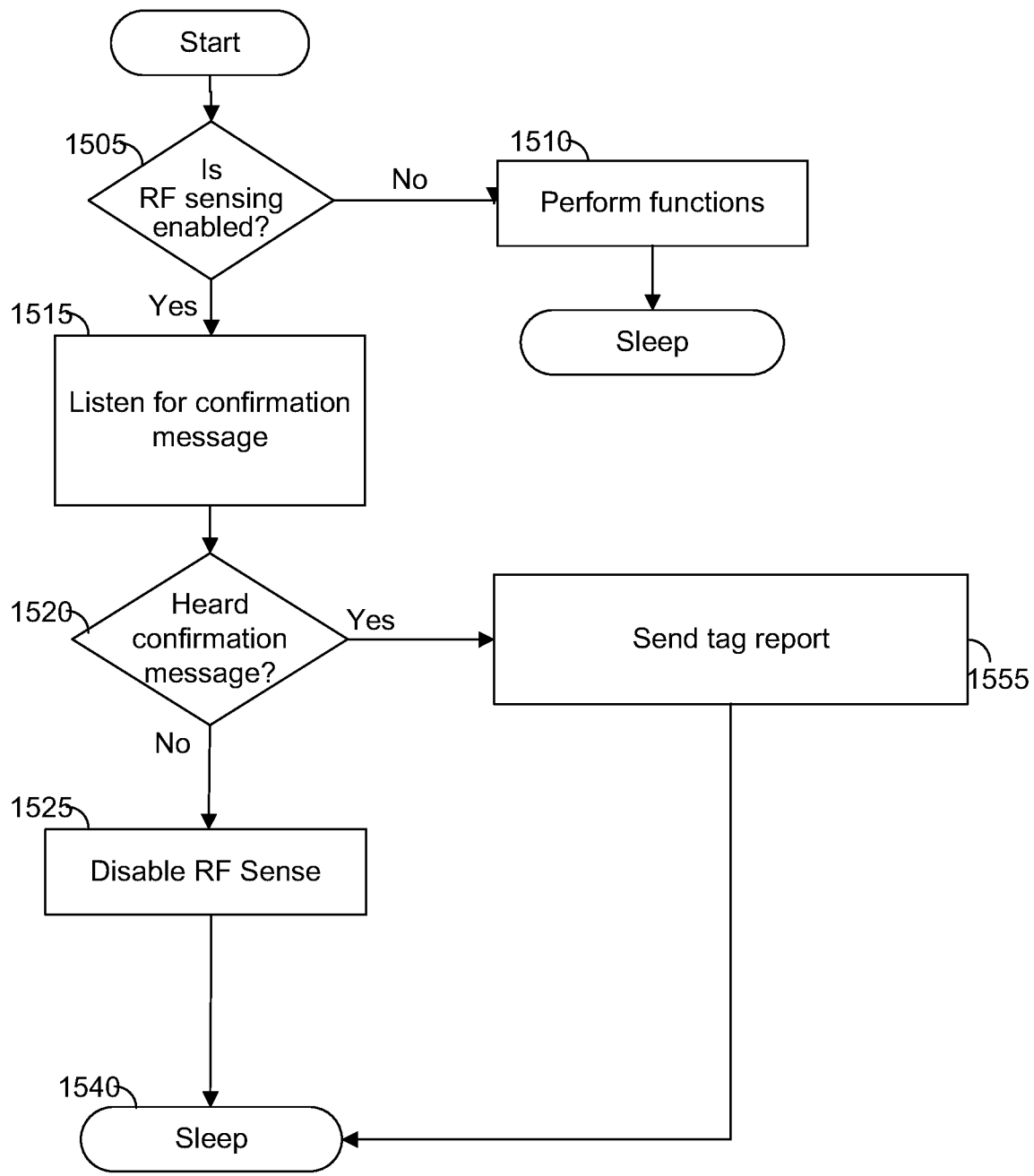
FIG. 14 is a flowchart illustrating an exemplary method for awakening a tag using RF sensing.

FIG. 14 depicts an exemplary embodiment of performing RF sensing for triggering the transmission of tag reports. In FIG. 14, when the predefined threshold of the RF detector 1010 is exceeded by RF energy sensed by the detector 1010, the detector 1010 determines whether RF sensing is enabled in step 1505. If so, the sleep cycle is interrupted and the processor 1015 is awoken. The control logic 1030 determines if the processor 1015 was awoken in response to an RF sensing event by the RF detector 1010. If not, control logic 1030 performs normal operations at step 1510, such as listening for a beacon and/or transmitting a tag report. If the processor 1015 was awoken in response to an RF sensing event, the control logic 1030 is configured to awaken the communication interface 1050 at step 1515, and the tag 510 listens for a confirmation message. At step 1520, the control logic 1030 determines whether a confirmation message is received within a predefined time period of reception of the RF sense signal. If so, the tag 510 transmits a tag report at step 1555, and the tag 510 returns to the sleep state.

If the tag 510 does not hear a confirmation message within a predefined time of reception of the RF sense signal, then it is likely that the RF energy detected by the detector 1010 is from an RF noise source rather than the mobile device 215. In such case, RF sensing is disabled at step 1525. In this regard, the control logic 1030 may adjust the configuration settings of the tag 510 such that no further RF sensing events trigger an awakening from a sleep state until RF sensing is later enabled, such as after a predefined amount of time has elapsed.

In some embodiments, an identifier associated with the mobile device 215, referred to hereafter as the "mobile device identifier," may be communicated to the tag 510 during an RF sensing event. As an example, the mobile device identifier may be included in the RF sense signal, the confirmation message, or other message transmitted to the tag 510. In addition, the tag 510 may be configured to include this identifier in the message for communicating the tag report so that the mobile device 215 can confirm that it received a tag report from the tag 510 to which the RF sense signal was directed. In this regard, there can be multiple mobile devices 215 in use at the facility 100 or other storage location. After the transmission of an RF sense signal by a first mobile device 215 to a first tag 510, a node 230 or the first mobile device 215 may receive a tag report transmitted by a second tag 510, such as a tag 510 that is responding to an RF sense signal from a second mobile device. Inclusion of the identifier of the first mobile device 215 by the first tag 510 confirms that the associated tag report was transmitted in response to the RF sense signal from the first mobile device 215.

After the tags 510 have been manufactured and first powered on they remain in a low power hibernation mode, referred to herein as "manufacture hibernation." The original firmware can be installed during an installation process or through a firmware update activated through the use of RF sensing. Either way, the tag 510 may stay in a low power state without waking until it is commissioned after activation through RF sensing or otherwise.

Commissioning a tag 510 can be done in a number of ways. In some embodiments, a tag 510 is awoken for commissioning using RF sensing and mobile device 215. In this regard, a user may position the mobile device 215 in sufficiently close proximity to an inventory item 210 such that the tag 510 of the item 210 is awoken by the RF sense signal from the mobile device 215. The tag 510 may respond with a tag report as, indicated above, indicating the tag identifier. A user may also use the mobile device 215 or otherwise to provide an identifier of the equipment contained in the case of the inventory item 210. As an example, the user may provide a user input to the mobile device 215 indicative of the equipment identifier, or the user may operate the mobile device 215 to scan or otherwise read the equipment identifier from the inventory item 210. In this regard, the case of the inventory item 210 may have a label, such as a QR barcode, from which the equipment identifier may be optically read. In other embodiments, other techniques for determining the equipment identifier may be used. The tag report and the equipment identifier may be transmitted to the server 530 (FIG. 5), which then stores and associates in memory the equipment identifier with the tag identifier. Thereafter, by receiving a tag report that includes the tag identifier of the tag 510 that transmitted the report, the server 530 is aware that the tag 510 and the equipment identified by the associated equipment identifier are at the facility 100 or other storage location being monitored. If desired, the tag 510 may receive the equipment identifier from the mobile device 215 or otherwise and update its data with the equipment identifier so that the equipment identifier may be included in future tag reports. Note that the equipment identifier may be unique to the equipment contained by the case of the inventory item 210, or the equipment identifier may describe or identify an aspect of the equipment such as identify equipment type (e.g., indicate that the equipment is a particular model or type of theatrical light).

An exemplary process for commissioning a tag 510 using a mobile device 215 will be described in more detail below.

For illustrative purposes, assume that each inventory item 210 has a readable barcode indicative of the equipment identifier for identifying the item 210, such as equipment in the case of the inventory item 210. As an example, each inventory item 210 may have a sticker on which such a barcode is printed. The tag 510 to be used to track the inventory item 210 is placed in close proximity to the mobile device 215 so that the tag 510 is in range to receive an RF sense signal from the mobile device 215. The mobile device 215 is then used to read the equipment identifier indicated by the barcode on the inventory item 210.

In this regard, the mobile device 215 may comprise an optical scanner that is used to scan the barcode to read the equipment identifier. In response to the reading of the equipment identifier, the mobile device 215 is configured to automatically transmit an RF sense signal that is received by and awakens the tag 510. In response to the RF sense signal 510, the tag 510 is configured to automatically and wirelessly transmit a tag report that includes the tag identifier identifying the tag 510, and the tag report is received by the mobile device 215.

At this point, the mobile device 215 is aware of both the equipment identifier for the inventory item 210 and the tag identifier for the tag 510 to be used to monitor the inventory item 210. The mobile device 215 is configured to transmit the tag identifier of the tag 510 and the equipment identifier of the inventory item 210 to the server 530, which stores the two identifiers and associates them in memory. Note that the tag 510 may be coupled to the inventory item 210 before or after the barcode of the item 210 is scanned or otherwise read by the mobile device 215.

Notably, in the exemplary commissioning process described above, only a single scan is required to complete the association between the equipment identifier and the tag identifier. This is in contrast to conventional commissioning processes that might require a user to operate a mobile device to scan a barcode of the inventory item and then to scan a barcode of the tag. By reducing the number of scans performed by a user, the commissioning of a tag can be completed quicker. While the time and effort saved for commissioning a single tag 510 might be small, this benefit becomes more pronounced as more tags 510 are scanned. As an example, there may be many thousands or even hundreds of thousands of tags 510 that may need to be commissioned at a single facility. Even slightly reducing the costs of commissioning a tag has a significant costs savings when such a large number of tags 510 are commissioned.

Figure 17:
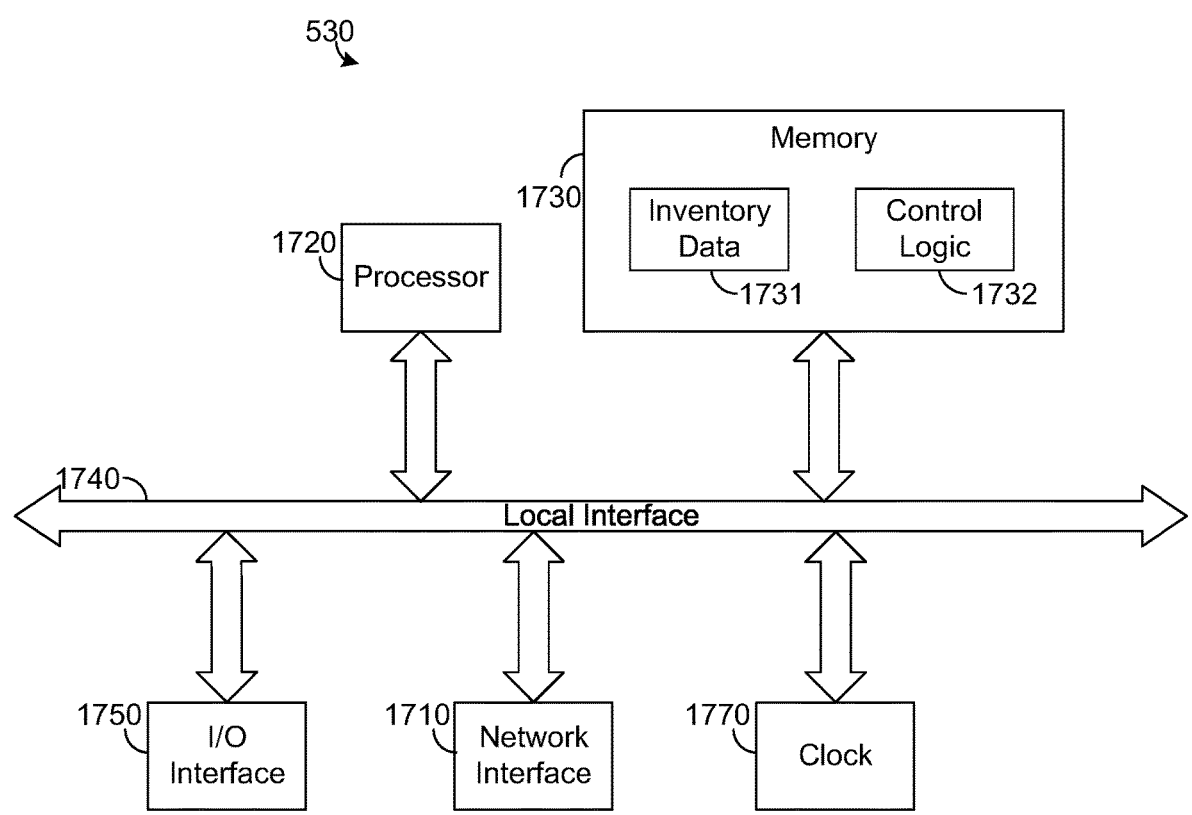
FIG. 17 is a block diagram illustrating an exemplary embodiment of a server, such as depicted by FIG. 5.

FIG. 17 depicts an exemplary embodiment of the server 530. The server 530 shown by FIG. 17 has a network interface 1710, one or more processors 1720, memory 1730, input output (I/O) interface 1750, and a clock 1770. The above components are connected through a local interface 1740 which may include at least one serial bus. The network interface 1710 is configured to communicate with the network 540 (FIG. 5). The server has control logic 1732 that is configured to generally control the operation of the server 530. The control logic 1732 may be implemented in hardware, software, or any combination thereof. In the embodiment depicted by FIG. 17, the control logic 1732 is implemented in software and stored in memory 1730, and instructions of the control logic 1732 are executed by the processor 1720.

The memory 1730 also stores inventory data 1731. The inventory data 1731 may store a list of tag identifiers of tags 510 at the facility 100 or other storage location monitored by the server 530. As an example, when the server 530 receives a tag report having a tag identifier not stored in the list, the control logic 1732 may update the list to add the tag identifier. If the server 530 does not receive a tag identifier from a tag 510 on the list for at least a specified amount of time, then it is likely that the identified tag 510 has left the facility 100 or other storage location, and the control logic 1732 may remove the tag identifier from the list. Also, it is possible for the server 530 to receive messages indicating that a tag 510 is leaving the facility 100 or other storage location.

As an example, a tag 510 that has entered the Exiting state may transmit a message indicating that the tag 510 is leaving the facility 100 or other storage location, and in response to such message, the control logic 1732 may remove the tag from the list or otherwise update the inventory data 1731 to indicate that the tag 510 is no longer present. Also, when a tag 510 is being taken from the facility 100 or other storage location, the mobile device 215 may communicate with the tag 510 (e.g., using RF sensing to wake the tag 510), and either the tag 510 or the mobile device 215 may transmit a message to the server 530 indicating that the tag 510 is leaving. In other embodiments, other techniques for indicating when a tag 510 is leaving or has left the facility 100 or other storage location are possible. Thus, the inventory data 1731 may be analyzed at any time to determine which tags 510 are presently located at the facility 100 or other storage location monitored by the server 530. In addition, the inventory data 1731 may also associate the tag identifiers with equipment identifiers, as indicated above, so that the inventory data 1731 may be used to identify which equipment is at the facility 100 or other storage location being monitored.

As indicated above, it is possible for one or more tags 510 to have RF sensing disabled, such as when an RF noise source is triggering false detections of RF sense signals. However, there are times when it may be desirable for RF sensing of the tags to be at least temporarily enabled. For example workers or technicians might need to use mobile devices 215 to track down and identify particular items 210. In such case, a user may submit a request for temporary enablement of RF sensing. Such a request may be received by the server 530 and communicated to each of the nodes 230. The nodes 230 may then be configured to transmit one or more messages to the tags 510 instructing them to enable RF sensing at least temporarily. Such instructions may be included in the beacons so that, the next time a tag 510 awakens and receives beacon, it is configured to update its settings to enable RF sensing in response to the beacon. In other embodiments, other techniques for communicating the instruction to the tags 510 are possible. In such embodiment, each tag 510 may be configured to enable RF sensing for a predefined period of time, or the time indicated for enablement of RF sensing may be indicated by the instruction. If RF sensing for all tags 510 does not need to be enabled, then the instruction may include the tag identifiers of the tags 510 that are to enable RF sensing, and only the identified tags 510 are configured to respond to the instruction for enabling RF sensing.

In addition, RF sensing may be enabled or disabled based on which state a tag 510 is in. For example, it may be desirable to disable RF sensing when a tag 510 leaves the facility or other storage location and to enable RF sensing upon a tag's return or entry into the facility 100 or other storage location. In such case, the control logic 1030 may be configured to disable RF sensing once the tag 510 enters the Exiting state or the Outside state and enable RF sensing when the tag 510 enters the Entering state or the Inside state. Various other techniques for controlling RF sensing are possible in other embodiments.

In some embodiments, the system 500 may be configured to track the location of the tags 510 based on signals communicated between the nodes 230 and the tags 510. As an example, the distance between a tag 510 and a node 230 may be determined using the received signal strength of a signal communicated between the tag 510 and the node 230 using techniques known in the art. In other embodiments, information about the tag's distance or other location information can be estimated using phase, time of flight, or angle of arrival of a signal communicated between the node 230 and a tag 510. In yet other embodiments, other techniques for determining location information are possible.

Each node 230 that obtains location information for a tag 510 may transmit such location information to the server 530, which may then determine the tag's location from the information received from multiple nodes 230. As an example, tag's distance from at least three nodes 230 may be used to determine the tag's location using trilateration, triangulation, or some other algorithm. In some embodiments, the nodes 230 and/or the tags 510 may have phase-array antennas for facilitating determination of location information about a tag 510.

An exemplary process for determining a tag's location may involve the use of one or more beacons transmitted by one or more nodes 230. In this regard, when a tag 510 receives a beacon transmitted by a node 230, the tag 510 may be configured to log the time that the beacon is received. Further, the tag 510 may include a timestamp indicative of this time in the tag report that is sent in response to the beacon. The tag 510 may also include the node identifier of the node 230 from which the beacon was received. The nodes 230 that receive the tag report may forward the tag report to the server 530, as described above. Each such node 230 may also send to the server 530 a timestamp indicative of the time that the node 230 received the tag report from the tag 510. Based on the information from the nodes 230, the server 530 may estimate the location of the tag 510 in three-dimensional space.

In this regard, for each node 230 that forwards the tag report, the server 530 may calculate the difference between the time that the node 230 received the tag report and the time indicated by the timestamp in the tag report (i.e., the time that the tag 510 received the beacon). This difference represents relative distance of the tag 510 from the respective node 230. That is, a larger value generally indicates that the node 230 is further from the tag 510. Thus, conventional time of flight algorithms may be used to estimate the location of the tag 510. In other embodiments, other techniques for determining the tag's location may be used.

Using techniques described herein, it is possible to design tags 510 that are highly-scalable and communicate efficiently across a relatively long range with very low power requirements. Indeed, using an SDR 1051 implemented with an EFR32™ Flex Gecko chip powered by a lithium-metal cell CR2032 MFR in conjunction with the techniques described herein for communicating and tracking tags 510, it is possible for the tags 510 to communicate at a range of about 150 meters or more with a battery life of about 7 years or more. Further, a system using the tags 510 can be scaled to several hundred thousand tags 510 for operation in a single warehouse or other type of large-scale storage facility.

Now, therefore, the following is claimed:

1. A system for tracking inventory items at a location, comprising:
a plurality of tags, each of the tags coupled to a respective one of a plurality of inventory items, the plurality of tags including at least a first tag having a software-defined radio configured to wirelessly transmit at a frequency greater than 1.0 Giga-Hertz (GHz) and a range of at least 100 meters in free space;
a plurality of nodes configured to wirelessly communicate with the plurality of tags, at least one of the nodes configured to wirelessly transmit a beacon to the plurality of tags, wherein the first tag is configured to receive the beacon and wirelessly transmit a tag identifier identifying the first tag to at least one of the nodes via the software-defined radio in response to the beacon; and
a server configured to receive the tag identifier from the at least one of the nodes and to determine that the inventory item coupled to the first tag is at the location in response to the tag identifier,
wherein the first tag is configured to operate in a first mode, wherein the first tag is configured to transition into and out of awake states and sleep states at a first rate while in the first mode, wherein the first tag is configured to transition from the first mode to a second mode in response to a beacon from the plurality of nodes, and wherein the first tag is configured to transition into and out of awake states and sleep states at a second rate different than the first rate in the second mode.

2. The system of claim 1, wherein each of the plurality of inventory items comprises a case containing at least one of the group including: theatrical lights, lighting support equipment, lighting accessories, and sound equipment.

3. The system of claim 1, wherein the software-designed radio is configured to consume less than 20 milli-Amps of current when communicating.

4. The system of claim 3, wherein the tag has a battery for powering the software-defined radio, and wherein the tag is configured such that the battery has a life of at least seven years.

5. The system of claim 1, wherein the software-defined radio is configured to wirelessly transmit the tag identifier through a channel at a data rate less than 200 kilo-bits-per-second.

6. The system of claim 5, wherein the frequency is between 2.4 GHz and 2.5 GHz.

7. The system of claim 6, wherein the software-designed radio is configured to consume less than 20 milli-Amps of current when communicating.

8. The system of claim 7, wherein the tag has a battery for powering the software-defined radio, and wherein the tag is configured such that the battery has a life of at least seven years.

9. The system of claim 6, wherein a bandwidth of the channel is at least 1 Mega-Hertz (MHz).

10. The system of claim 1, wherein the first tag is configured to select a channel for transmitting the tag identifier based on the beacon.

11. The system of claim 1, wherein the first tag is configured to randomly select a channel from a predefined set of channels for transmitting the tag identifier.

12. The system of claim 1, wherein the first tag is configured to listen on a predefined channel for information identifying at least one channel for communicating with the plurality of nodes, and wherein the first tag is configured to transmit the tag identifier via the at least one channel based on the information.

13. The system of claim 1, wherein the plurality of tags and the plurality of nodes form a wireless mesh network, and wherein the server is configured to communicate with the plurality of nodes via a network different than the wireless mesh network.

14. The system of claim 1, wherein the first tag is configured to determine whether the first tag has received a beacon from the plurality of nodes within a defined time period, and wherein the first tag is configured to transition from the first mode to the second mode based on a determination whether the first tag has received a beacon from the plurality of nodes during the defined time period.

15. The system of claim 1, wherein the second rate is greater than the first rate.

16. The system of claim 1, wherein the second rate is less than the first rate.

17. A system for tracking inventory items at a location, comprising:
a plurality of tags, each of the tags coupled to a respective one of a plurality of inventory items, the plurality of tags including at least a first tag having a software-defined radio configured to wirelessly transmit at a frequency greater than 1.0 Giga-Hertz (GHz) and a range of at least 100 meters in free space;
a plurality of nodes configured to wirelessly communicate with the plurality of tags, at least one of the nodes configured to wirelessly transmit a beacon to the plurality of tags, wherein the first tag is configured to receive the beacon and wirelessly transmit a tag identifier identifying the first tag to at least one of the nodes via the software-defined radio in response to the beacon; and
a server configured to receive the tag identifier from the at least one of the nodes and to determine that the inventory item coupled to the first tag is at the location in response to the tag identifier,
wherein the first tag is configured to operate during a first awake state and a second awake state, wherein the first tag is configured to transition to a sleep state from the first awake state and to transition from the sleep state to the second awake state, wherein the first tag is configured to listen for beacons from the plurality of nodes via a first channel and not a second channel during the first awake state, and wherein the first tag is configured to listen for beacons from the plurality of nodes via the second channel and not the first channel during the second awake state.

18. The system of claim 17, wherein the software-defined radio is configured to wirelessly transmit the tag identifier through a channel at a data rate less than 200 kilo-bits-per-second.

19. The system of claim 18, wherein the frequency is between 2.4 GHz and 2.5 GHz.

20. The system of claim 19, wherein the software-designed radio is configured to consume less than 20 milli-Amps of current when communicating.

21. A system for tracking inventory items at a location, comprising:
a plurality of tags, each of the tags coupled to a respective one of a plurality of inventory items, the plurality of tags including at least a first tag having a software-defined radio configured to wirelessly transmit at a frequency greater than 1.0 Giga-Hertz (GHz) and a range of at least 100 meters in free space;
a plurality of nodes configured to wirelessly communicate with the plurality of tags, at least one of the nodes configured to wirelessly transmit a beacon to the plurality of tags, wherein the first tag is configured to receive the beacon and wirelessly transmit a tag identifier identifying the first tag to at least one of the nodes via the software-defined radio in response to the beacon; and
a server configured to receive the tag identifier from the at least one of the nodes and to determine that the inventory item coupled to the first tag is at the location in response to the tag identifier,
wherein the first tag comprises a temperature sensor, wherein the first tag is configured to transition from a sleep state to an awake state, and wherein the first tag is configured to enable the software-defined radio for communication during the awake state based on a temperature sensed by the temperature sensor.

22. The system of claim 21, wherein the software-defined radio is configured to wirelessly transmit the tag identifier through a channel at a data rate less than 200 kilo-bits-per-second.

23. The system of claim 22, wherein the frequency is between 2.4 GHz and 2.5 GHz.

24. The system of claim 23, wherein the software-designed radio is configured to consume less than 20 milli-Amps of current when communicating.

25. A method for tracking inventory items at a location, comprising:
transmitting a beacon from at least one node of a plurality of nodes at the location;
receiving the beacon at a tag;
communicating between the tag and the plurality of nodes, the communicating comprising transmitting, in response to the beacon, a wireless signal from a software-defined radio of the tag to at least one of the plurality of nodes at a frequency greater than 1.0 Giga-Hertz (GHz), wherein the wireless signal has a range of at least 100 meters in free space and defines a message having a tag identifier identifying the tag;
transmitting the tag identifier from at least one of the nodes to a server;
tracking the tag, at the server, based on the tag identifier;
operating the tag in a first mode;
transitioning the tag into and out of awake states and sleep states at a first rate while the tag is operating in the first mode;
transitioning the tag from the first mode to a second mode in response to a beacon from the plurality of nodes; and
transitioning the tag into and out of awake states and sleep states at a second rate different than the first rate while the tag is operating in the second mode.

26. The method of claim 25, wherein the software-designed radio consumes less than 20 milli-Amps of current during the transmitting the wireless signal.

27. The method of claim 25, wherein the software-defined radio is configured to transmit the wireless signal at a rate less than 200 kilo-bits-per-second.

28. The method of claim 27, wherein the frequency is between 2.4 GHz and 2.5 GHz.

29. The method of claim 25, further comprising determining whether the first tag has received a beacon from the plurality of nodes within a defined time period, wherein the transitioning the tag from the first mode to the second mode is based on the determining.

30. A method for tracking inventory items at a location, comprising:
transmitting a beacon from at least one node of a plurality of nodes at the location;
receiving the beacon at a tag;
communicating between the tag and the plurality of nodes, the communicating comprising transmitting, in response to the beacon, a wireless signal from a software-defined radio of the tag to at least one of the plurality of nodes at a frequency greater than 1.0 Giga-Hertz (GHz), wherein the wireless signal has a range of at least 100 meters in free space and defines a message having a tag identifier identifying the tag;
transmitting the tag identifier from at least one of the nodes to a server;
tracking the tag, at the server, based on the tag identifier;
transitioning the tag from a first awake state to a sleep state;
transitioning the tag from the sleep state to a second awake state;
listening, at the tag, for beacons from the plurality of nodes via a first channel and not a second channel during the first awake state; and
listening, at the tag, for beacons from the plurality of nodes via the second channel and not the first channel during the second awake state.

31. The method of claim 30, wherein the software-defined radio is configured to transmit the wireless signal at a rate less than 200 kilo-bits-per-second.

32. The method of claim 31, wherein the software-designed radio consumes less than 20 milli-Amps of current during the transmitting the wireless signal.

33. The method of claim 32, wherein the frequency is between 2.4 GHz and 2.5 GHz.

34. A method for tracking inventory items at a location, comprising:
transmitting a beacon from at least one node of a plurality of nodes at the location;
receiving the beacon at a tag;
communicating between the tag and the plurality of nodes, the communicating comprising transmitting, in response to the beacon, a wireless signal from a software-defined radio of the tag to at least one of the plurality of nodes at a frequency greater than 1.0 Giga-Hertz (GHz), wherein the wireless signal has a range of at least 100 meters in free space and defines a message having a tag identifier identifying the tag;
transmitting the tag identifier from at least one of the nodes to a server;

tracking the tag, at the server, based on the tag identifier;
transitioning the tag from a sleep state to an awake state;
sensing a temperature with a temperature sensor of the tag; and
determining whether to enable the software-defined radio during the awake state based on the sensed temperature.

35. The method of claim 34, wherein the software-defined radio is configured to transmit the wireless signal at a rate less than 200 kilo-bits-per-second.

36. The method of claim 35, wherein the software-designed radio consumes less than 20 milli-Amps of current during the transmitting the wireless signal.

37. The method of claim 36, wherein the frequency is between 2.4 GHz and 2.5 GHz.

* * * * *